(12) United States Patent
Agarwal

(10) Patent No.: US 11,768,916 B2
(45) Date of Patent: Sep. 26, 2023

(54) DETECTION OF SENSITIVE DATABASE INFORMATION

(71) Applicant: PayPal, Inc., San Jose, CA (US)

(72) Inventor: Anchika Agarwal, Singapore (SG)

(73) Assignee: PayPal, Inc., San Jose, CA (US)

( * ) Notice: Subject to any disclaimer, the term of this patent is extended or adjusted under 35 U.S.C. 154(b) by 594 days.

(21) Appl. No.: 16/818,802

(22) Filed: Mar. 13, 2020

(65) Prior Publication Data

US 2021/0182607 A1 Jun. 17, 2021

Related U.S. Application Data

(63) Continuation-in-part of application No. 16/711,071, filed on Dec. 11, 2019, now Pat. No. 11,379,601.

(51) Int. Cl.
*G06F 16/00* (2019.01)
*G06F 18/2413* (2023.01)
(Continued)

(52) U.S. Cl.
CPC ........ *G06F 18/2413* (2023.01); *G06F 16/164* (2019.01); *G06F 16/221* (2019.01);
(Continued)

(58) Field of Classification Search
CPC .. G06K 9/6256; G06K 9/6217; G06K 9/6227; G06K 9/6228; G06K 9/6267;
(Continued)

(56) References Cited

U.S. PATENT DOCUMENTS 6,999,950 B1 2/2006 Linneberg et al.
7,161,465 B2 1/2007 Wood et al.
(Continued)

FOREIGN PATENT DOCUMENTS

WO 2000072171 11/2000

OTHER PUBLICATIONS

Sun Y.G., "Access Control Method Based on Multi-Level Security Tag for Distributed Database System", 2011, International Conference on Electronic & Mechanical Engineering and Information Technology, pp. 2509-2512.
(Continued)

*Primary Examiner* — Dinku W Gebresenbet
(74) *Attorney, Agent, or Firm* — Kowert, Hood, Munyon, Rankin & Goetzel, P.C.; Scott W. Pape; Dean M. Munyon

(57) ABSTRACT

A computer system performs a scan to identify data items in a database that correspond to one or more of a plurality of specified output classes. The scan includes determining metadata for a portion of the database, and generating a data profile for a set of data items stored in the portion of the database. The generating includes performing a character-based analysis of the set of data items. The scan further includes identifying whether the set of data items corresponds to one of the plurality of specified output classes by utilizing a multi-class neural network classifier trained to perform the identifying using a plurality of features, including features extracted from the metadata and the data profile. The computing system identifies, based on outputs of the multi-class neural network classifier, a particular one of the plurality of specified output classes that corresponds to the set of data items.

20 Claims, 17 Drawing Sheets

(51) Int. Cl.
  *G06N 3/04* (2023.01)
  *G06F 16/22* (2019.01)
  *G06F 16/16* (2019.01)
  *G06F 18/214* (2023.01)
  *G06F 18/21* (2023.01)
  *G06F 18/24* (2023.01)
  *G06F 18/211* (2023.01)
  *G06F 18/243* (2023.01)
  *G06F 18/20* (2023.01)

(52) U.S. Cl.
  CPC .......... *G06F 16/2282* (2019.01); *G06F 18/21* (2023.01); *G06F 18/211* (2023.01); *G06F 18/214* (2023.01); *G06F 18/24* (2023.01); *G06F 18/243* (2023.01); *G06F 18/285* (2023.01); *G06N 3/04* (2013.01)

(58) Field of Classification Search
  CPC ...... G06K 9/6279; G06K 9/627; G06K 9/628; G06F 16/164; G06F 16/221; G06F 16/2282; G06N 3/04; G06N 3/0427; G06N 5/046; G06V 10/82; G06V 2201/10
  See application file for complete search history.

(56) References Cited

U.S. PATENT DOCUMENTS

| | | | |
|---|---|---|---|
| 8,256,006 B2 | 8/2012 | Grzymala-Busse et al. | |
| 8,261,342 B2 | 9/2012 | Newman | |
| 9,324,022 B2 | 4/2016 | Williams, Jr. et al. | |
| 9,419,857 B1 | 8/2016 | Ryan et al. | |
| 9,749,349 B1 | 8/2017 | Czarny et al. | |
| 9,779,253 B2 | 10/2017 | Mahaffey et al. | |
| 10,715,542 B1 | 7/2020 | Wei et al. | |
| 10,839,052 B2 | 11/2020 | Williams et al. | |
| 2004/0015728 A1 | 1/2004 | Cole et al. | |
| 2004/0068661 A1 | 4/2004 | Dettinger et al. | |
| 2015/0242531 A1 | 8/2015 | Rodniansky | |
| 2015/0254555 A1 | 9/2015 | Williams, Jr. et al. | |
| 2018/0232528 A1* | 8/2018 | Williamson | G06N 20/00 |
| 2020/0328885 A1 | 10/2020 | Tola et al. | |
| 2021/0119764 A1 | 4/2021 | Meghji | |
| 2021/0224258 A1* | 7/2021 | Faruquie | G06F 16/215 |

OTHER PUBLICATIONS

Kvet M., et al., "Temporal Database Architecture Enhancements," Proceeding of the 22nd Conference of Fruct Association, May 2018, 10 pages.

International Search Report and Written Opinion in PCT Appl. No. PCT/US2020/064201 dated Feb. 19, 2021, 8 pages.

Neculoiu et al. "Learning Text Similarity with Siamese Recurrent Networks", Proceedings of the 1st Workshop on Representation Learning for NLP, Aug. 11, 2016. Retrieved on Jan. 28, 2021. Retrieved from <URL: https://www.aclweb.org/anthology/W16-1617.pdf> entire document.

Takase et al. "Character n-gram Embeddings to Improve RNN Language Models", arXiv, 1906.05506v1, Jun. 13, 2019. Retrieved on Jan. 28, 2021. Retrieved from <URL: https://arxiv.org/pdf/1906.05506.pdf> entire document.

* cited by examiner

Security rules 130

| rule 330a | email address | email addresses permitted |
|---|---|---|
| rule 330b | login credentials | credentials encrypted |
| rule 330c | home address | home addresses encrypted |
| rule 330d | telephone number | telephone numbers encrypted |
| rule 330e | credit card data | credit card data restricted |

Scan models 235

| model 335a | media | don't scan |
|---|---|---|
| model 335b | encrypted | scan for credit card data |
| model 335c | text | default scan |
| model 335d | email contacts | scan for home address and telephone number |

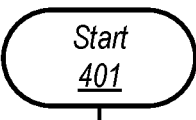
Start
401

Maintaining a first database within a first security zone having a first set of security rules, wherein the first set of security rules defines restrictions for storing data objects within the first security zone.
410

Maintaining a second database within a second security zone having a second set of security rules, wherein the second set of security rules defines restrictions for storing data objects within the second security zone.
420

Performing, by a computer system within the first security zone, a first scan of the first database to determine whether data objects stored in the first database comply with the first set of security rules.
430

Performing, by the computer system within the second security zone, a second scan of the second database to determine whether data objects stored in the second database comply with the second set of security rules.
440

Conveying, by the computer system, results of the first and second scans to a repository zone for review by an administrator, wherein the results are conveyed without conveying the data objects stored in the first and second databases to the repository zone.
450

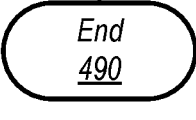
End
490

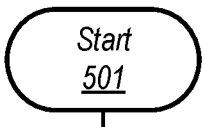
Start
501

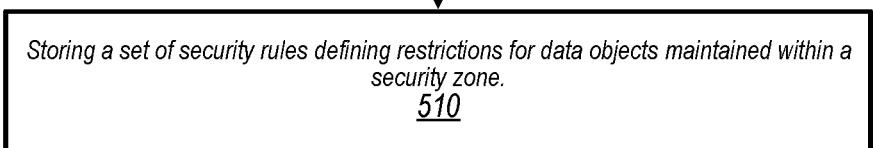
Storing a set of security rules defining restrictions for data objects maintained within a security zone.
510

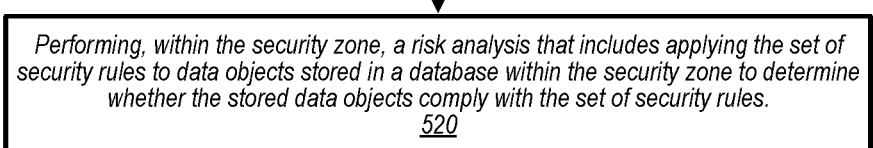
Performing, within the security zone, a risk analysis that includes applying the set of security rules to data objects stored in a database within the security zone to determine whether the stored data objects comply with the set of security rules.
520

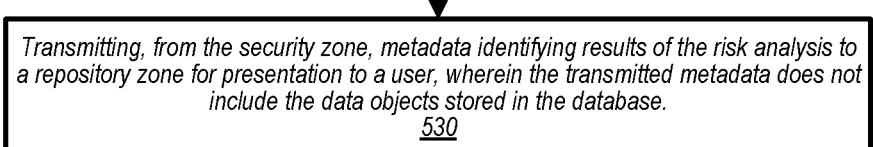
Transmitting, from the security zone, metadata identifying results of the risk analysis to a repository zone for presentation to a user, wherein the transmitted metadata does not include the data objects stored in the database.
530

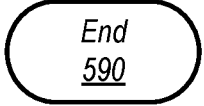
End
590

```
                    ┌─────────┐
                    │  Start  │
                    │  1501   │
                    └────┬────┘
                         ▼
```

Performing, by a computer system, a scan to identify data items in a database that correspond to ones of a plurality of specified output classes, the scan including:
1510

Determining metadata for a portion of the database, wherein the metadata includes schema information.
    1520

Generating a data profile for a set of data items stored in the portion of the database, wherein the generating includes performing a character-based analysis of the set of data items.
    1530

Identifying whether the set of data items corresponds to one of the plurality of specified output classes by utilizing a multi-class neural network classifier trained to perform the identifying using a plurality of features, including features extracted from the metadata and the data profile.
    1540

Identifying, based on outputs of the neural network classifier, a particular output class of the plurality of specified output classes that corresponds to the set of data items.
    1550

End
1590

*FIG. 15*

DETECTION OF SENSITIVE DATABASE INFORMATION

BACKGROUND

The present application is a continuation-in-part of U.S. application Ser. No. 16/711,071, filed Dec. 11, 2019, the disclosure of which is incorporated by reference herein in its entirety.

TECHNICAL FIELD

This disclosure relates generally to computer system operation, and more particularly to identifying sensitive data objects within a computer system.

DESCRIPTION OF THE RELATED ART

A business, government agency, school system, or any other form of large, multi-user entity may rely on an enterprise computing system to provide a computing infrastructure for a plurality of users. An enterprise computing system typically includes one or more server computers to provide computing power and one or more databases to provide network accessible information storage for these users. As an enterprise computing system grows, so too does the amount of accessible information being created by services and users, and stored in the one or more databases. Various databases within an enterprise computing system may have different security rules based on a type of information that is permitted to be stored in each database. For a particular database, these security rules may include identifying types of data that are permitted to be stored in the particular database along with specifying a particular storage format for each type, e.g., usernames and passwords may be permitted if the information is encrypted using a particular encryption algorithm, while credit card or other financial information may be forbidden from being stored on the particular database. One reason for implementing security rules is to limit accessibility to individual pieces of information in the event of a database breach.

A database breach occurs when an unauthorized user gains access to a restricted database, such as a hacker gaining access to a company's user account database, potentially allowing the hacker to access individual user accounts. Data protection laws are being enacted globally to motivate entities that manage databases with sensitive information to improve their security standards, thereby reducing exposure of sensitive information stored on their databases. Failure of an entity to follow these data protection laws may result in fines and/or lawsuits.

BRIEF DESCRIPTION OF THE DRAWINGS

FIG. 3 includes two tables depicting, respectively, a set of security rules and a set of scan models.

FIG. 4 is a flow diagram illustrating an example method for performing a risk analysis scan, according to some embodiments.

FIG. 5 shows a flow diagram of an embodiment of a method for performing a risk analysis scan within a particular security zone.

FIG. 15 is a flow diagram illustrating an example method for performing a scan of data items in a database, according to some embodiments.

DETAILED DESCRIPTION

Figure 1:
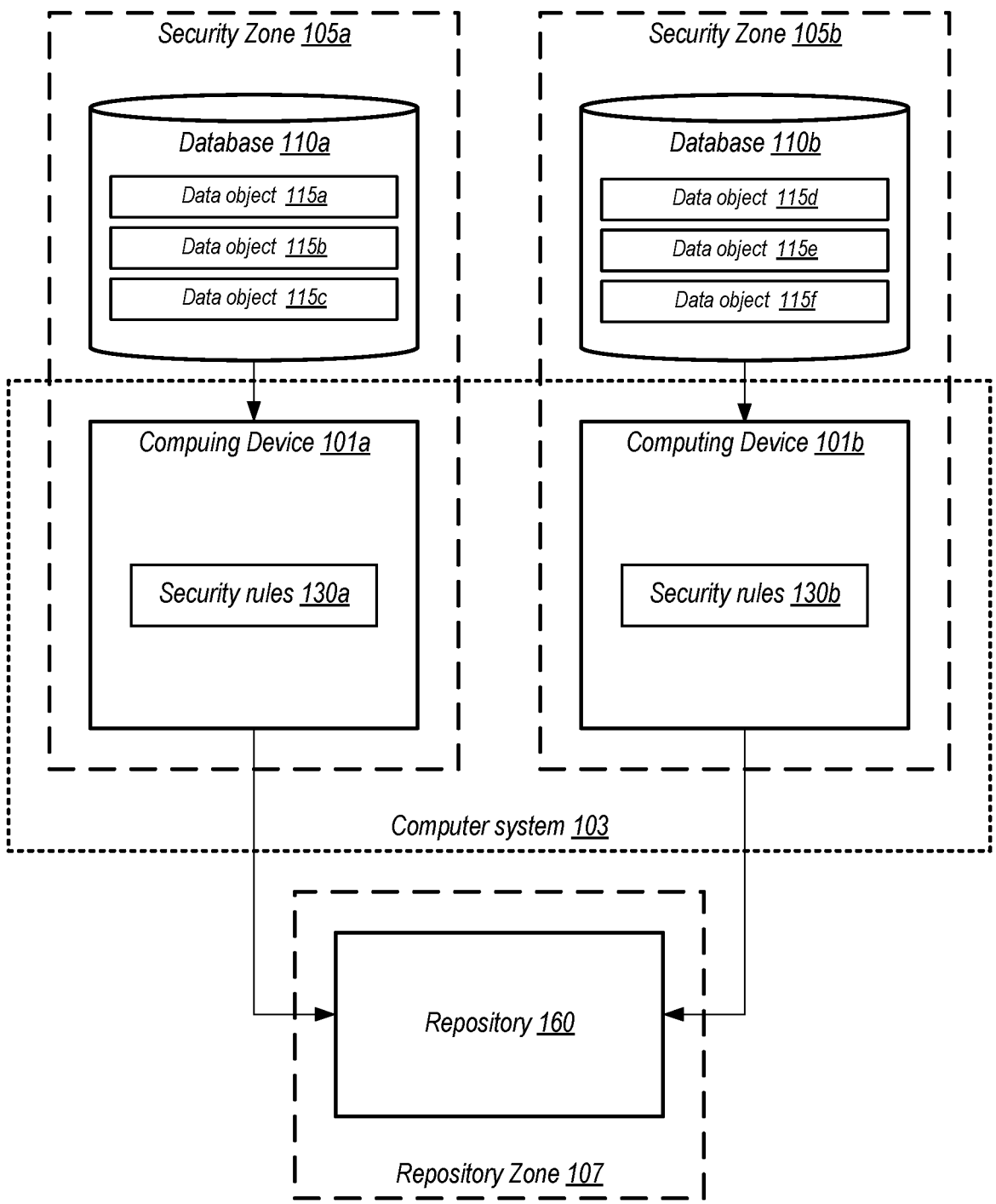
FIG. 1 illustrates a block diagram of an embodiment of an enterprise computing system.

Large-scale database breaches have made global news in recent years. In some breaches, sensitive data was not protected using an appropriate level of security, allowing hackers to gain access to and exploit information such as user account credentials or credit card information. The problem also grows as the amount of data being handled by an enterprise increases. Some enterprise computing systems may include multiple databases that can, combined, include many terabytes of data being stored by multiple users (thousands or even millions of users in some cases). Accordingly, system administrators that are responsible for reviewing and maintaining proper storage of information in accordance with established security rules have the challenge of adequately scanning information stored in each database to determine if each data item is being stored in accordance to the security rules for a respective database. The present inventors have recognized the desirability of a technique that can increase a system administrator's capability to scan a large amount of information that is stored across multiple databases in a computing system such as an enterprise computing system.

Techniques are disclosed herein for scanning a plurality of data objects that are stored in a first database within a first security zone having a first set of security rules, and a second database within a second security zone having a second set of security rules. A "zone" refers to a collection of one or more data repositories (e.g., databases or other memory) that have some common characteristic (e.g., they are controlled by a particular network device, located in a common location, operate according to a set of policy rules, etc.). A "security zone" is a zone that is managed according to a set of security rules. A system administrator or other authorized entity establishes a set of rules for a particular zone based, for example, on a type of information that is or will be stored in the data repositories that are included in the particular security zone. Multiple different security zones may exist within a computer network, with the potential that each zone might have a different set of security rules. A change to the set of security rules for a given security zone changes the security rules for the one or more databases in the given security zone. In one example, a computer system performs a first scan of the first database to determine whether data objects stored in the first database comply with the first set of security rules. The computer system then performs a second scan of the second database to determine whether data objects stored in the second database comply with the second set of security rules. After completing the scans, the computer system conveys results of the first and second scans to a repository zone (that is, a zone for storing the results, which can be any suitable data repository) for review by a system administrator. Since the data objects being scanned may include sensitive information, the results are conveyed without conveying the actual data objects to the repository zone.

To perform a scan of one or more databases, techniques are contemplated that utilize a neural network classifier to identify data items that correspond to one or more of a set of specified output classes. As used herein, an "output class" refers to a type or classification of data that have one or more characteristics in common and that are identifiable by a neural network. One such technique includes performing a scan to identify data items in a database that correspond to one or more of a plurality of specified output classes. This scan includes determining metadata for a portion of the database, and generating a data profile for a set of data items stored in the portion of the database. Features extracted from the metadata and the data profile are sent to a multi-class neural network classifier trained to identify whether the set of data items corresponds to one of the plurality of specified output classes. Based on outputs of the neural network classifier, a particular output class may be identified that corresponds to the set of data items.

Figure 2:
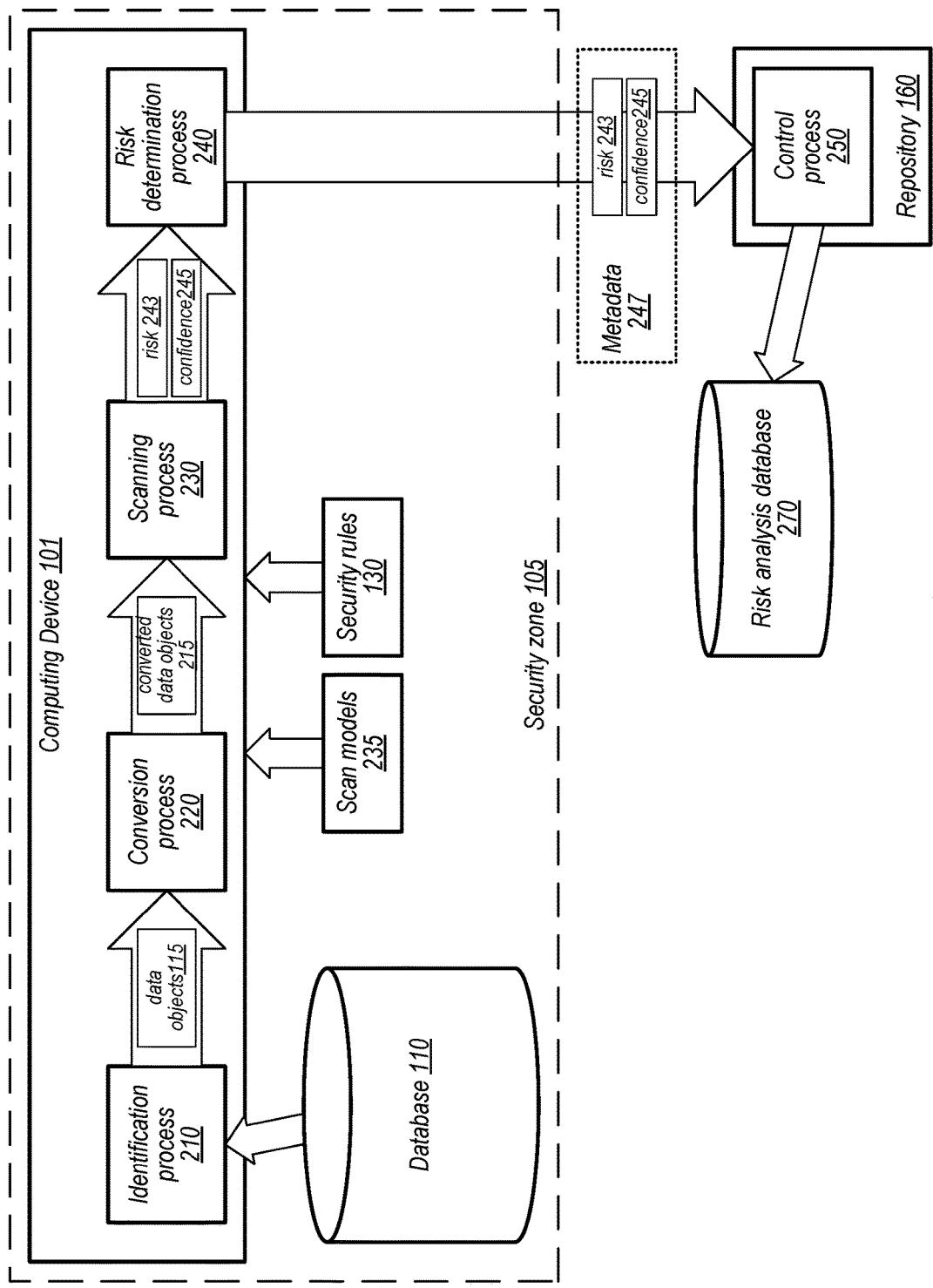
FIG. 2 shows a block diagram of an example of a risk analysis scanning system, according to some embodiments.
Figure 16:
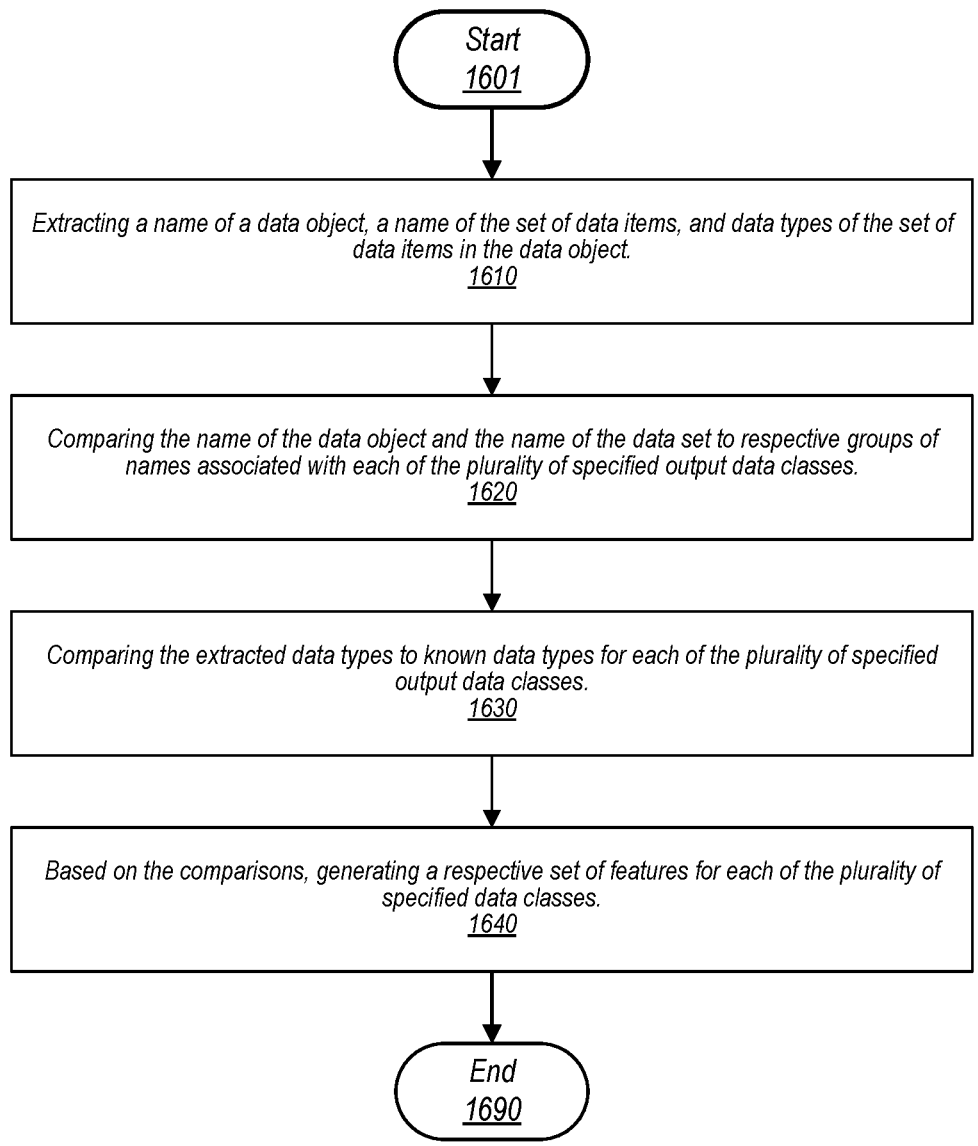
FIG. 16 shows a flow diagram of an embodiment of a method for operating a metadata extraction pipeline.
Figure 17:
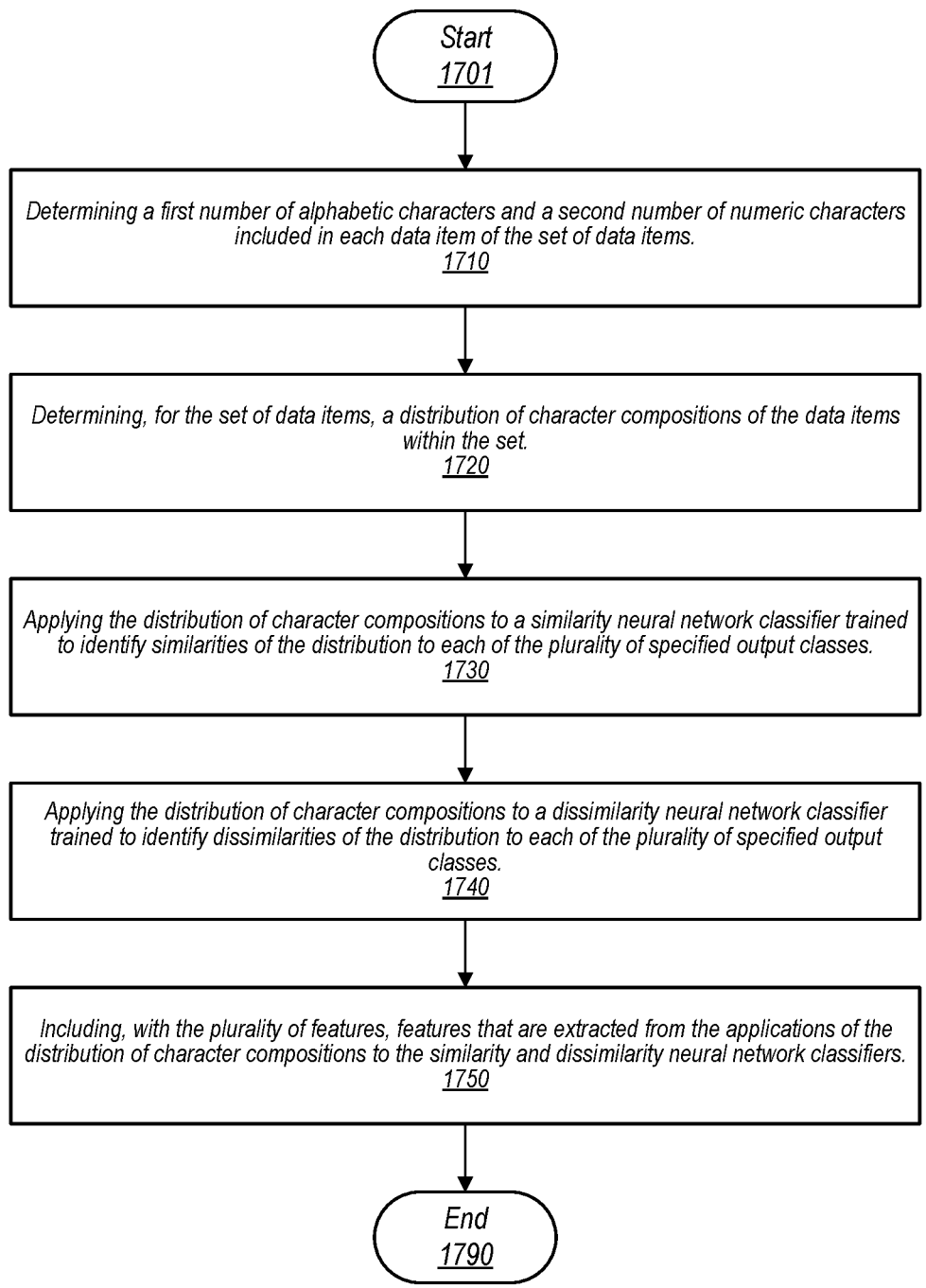
FIG. 17 is a flow diagram depicting an example method for operating a data profile transformation pipeline, according to some embodiments.

In the associated drawings and related descriptions that follow, an architecture of a system for scanning databases to identify data belonging to one of a plurality of specified output classes is disclosed in FIGS. 1-3. FIGS. 4-8 provide examples of methods for operating such a system architecture. FIG. 9 discloses an example of a computing system that may be used as part of the system architecture. FIGS. 10-14 illustrate possible techniques for utilizing a neural network to perform a scan of one or more databases to identify classifications of stored data. FIGS. 15-17 depict methods that may used for implementing such a neural network. The architecture embodiments disclosed with reference to FIGS. 1-9 may be implemented in some cases using the embodiments of FIGS. 10-17, but are not so limited. Similarly, while the neural network embodiments disclosed with reference to FIGS. 10-17 may be used in the context of the embodiments of FIGS. 1-9, other applications are possible.

Architecture for Detecting Sensitive Database Information

A block diagram of an embodiment of an enterprise computing system is illustrated in FIG. 1. As shown, enterprise computing system 100 includes security zones 105*a* and 105*b*, as well as repository zone 107. Each of security zones 105*a* and 105*b* include respective one of databases 110*a* and 110*b*, each database storing a respective subset of data objects 115*a*-115*f*. Security zones 105*a* and 105*b* also include a respective one of computing devices 101*a* and 101*b*, each computing device including a respective one of security rules 130*a* and 130*b*. Repository zone 107 includes repository 160.

Enterprise computing system 100 may be any suitable computing system utilized by an entity (business, government, education system, and the like) to provide computing services to multiple users. In various embodiments, enterprise computing system may be implemented on a few computing devices that are all located in one room, may be implemented on hundreds or thousands of computing devices located across the world, or may be implemented on a scale between these examples. Databases 110*a* and 110*b* are maintained in one or more respective storage devices, such as magnetic hard drives, solid-state drives, removable storage devices (e.g., CD-ROM, DVD-ROM, etc.), and the like.

As illustrated, databases 110*a* and 110*f* are maintained in security zones 105*a* and 105*b*, respectively. Each security zone 105*a* and 105*b* has a respective set of security rules 130*a* and 130*b*. Security rules 130*a* and 130*b* define restrictions for storing data objects within security zones 105*a* and 105*b*, respectively. Each of security rules 130*a* and 130*b* include indications of one or more types of information that may be stored in the respective database 110*a*-110*b*, along with any particular restrictions for storing a given type of information.

For example, database 110*a* may be accessible by a small number of users that have a high level of access permissions within enterprise computing system 100. Access to database 110*a* may, therefore be limited with multiple levels of authentication required to access anyone of data objects 115*a*-115*c* that are stored in database 110*a*. Accordingly, security rules 130*a* may allow for a wide variety of types of information to be stored in database 110*a*, such as user account credentials, financial information, classified reports, and the like. Database 110*b*, however, may be accessible to all employees of an entity that owns enterprise computing system 100, and/or to external owners of accounts with the entity. Security rules 130*b*, therefore, may be more restrictive than security rules 130*a* since database 110*b* is accessible by a greater number of users. Furthermore, database 110*b* may require fewer authentication steps, thereby making database 110*b* more vulnerable to hacking by an unauthorized user than database 110*a*. Security rules 130*b* may restrict storage of user account credentials to data objects that are encrypted by an approved encryption algorithm, and may forbid storage of financial or confidential information altogether.

Data objects 115*a*-115*f* may correspond to any suitable form of electronic data, such as text files, binary files, executable files, and the like. For example, a data object may be a word processor file, a spreadsheet file, a saved email, an executable script, an image file, an audio file, or any other type of data that may be stored in a database. Due to the nature of the various types of data that may be stored in a particular database, security rules 130*a* and 130*b* may not be enforceable at a time when a data object is stored. A particular user may, intentionally or not, store a document that includes classified information into database 110*b* even though the particular user has been made aware of security rules 130*b*.

To help a system administrator identify potential security rule violations, a scan may be performed to access data objects stored in the various databases and determine a type of data in a given data object and evaluate storage of the given data object based on the respective security rules. As shown, computer system 103 performs, within security zone 105*a*, a first scan of database 110*a* to determine whether a randomly selected first group of data objects 115*a*-115*c* that are stored in database 110*a* comply with security rules 130*a*.

Computer system 103 includes computing devices 101a and 101b, each in a respective one of security zones 105a and 105b. To perform the first scan, computing device 101a accesses each of data objects 115a-115c, determines one or more types of data that may be stored in each data object and then compares the determined data types to the security rules for storage of the determined data types. Any potential violations are logged. In a similar manner, computer system 103 also performs, within security zone 105b, a second scan of database 110b to determine whether a randomly selected second group of data objects 115d-115f that are stored in database 110b comply with security rules 130b. To perform the second scan, computer system 103 utilizes computing device 101b that is within security zone 105b.

In some embodiments, not all data objects stored in a database are scanned during a given risk analysis scan. For example, in some embodiments, certain types of data objects may not be scanned, such as media files, program executable files, and/or operating system files. In some embodiments, databases 110a and/or 110b may include a very large amount of data, such as terabytes or petabytes of data. Such large amounts of data may be impractical to scan, depending on an amount of processor bandwidth available for performing the scan, as well access times for retrieving the data objects from databases 110a and 110b. In such embodiments, data objects 115a-115f may be selected at random from databases 110a and 110b. As used herein, "selecting at random" and "randomly selecting" refers to use of an algorithm or other suitable technique to select data objects in an order that is not easily repeatable. It is noted that some randomizing techniques, commonly referred to as "pseudo-random," may not result in a truly random pattern, and may therefore, be repeatable under controlled conditions. Use herein of "randomly selecting" and "selected at random" include both truly random and pseudo-random techniques.

In the illustrated embodiment, a particular security rule included in security rules 130a or security rules 130b includes one or more criteria that are usable to match a given data object to a particular classification. To perform the first and second scans, computer system 103, utilizing the respective computing devices 101a and 101b, uses the one or more criteria to determine a confidence score for a particular one of data object 115a-115f. This confidence score indicates a level of confidence that the particular data object matches the particular classification. The particular security rule specifies a respective level of security to be enforced on a given data object that is matched to the particular classification. Computer system 103 compares the specified level of security for the particular data object to a security level of the respective one of security zones 105a and 105b. In some cases, the particular data object is encrypted, and to determine the confidence score for an encrypted data object, computer system 103 determines the confidence score without performing a decryption operation. For example, computer system 103 may not have access to a decryption key for an encrypted data object. In such a case, computer system 103 may evaluate the encrypted data object by looking for particular patterns in the encrypted data that may be indicative of particular data types such as credit card numbers or email addresses. The confidence score may typically be lower for encrypted data than for unencrypted data.

It is noted that, as shown in FIG. 1, computer system 103 includes a plurality of computing devices 101a-101b, each computing device 101a-101b included in a respective security zone 105a-105b. Computer system 103 utilizes respective computing devices 101a-101b to perform the corresponding first and second scans. Each of computing devices 101a and 101b may be, for example, a desktop or laptop computer, a server computer hosting the respective database, a dedicated hardware device for performing scans, a virtual machine assigned to a respective security zone, or any other suitable device capable of performing the disclosed operations. In some embodiments, however, a same computing device with access to each security zone may be utilized to perform each of the first and second scans. For example, enterprise computing system 100 may be implemented partially or entirely within a cloud-based computing system. It is contemplated that some or all of the elements of enterprise computing system 100 may be implemented on a common physical computing device, such as a single blade server included in a server computer.

After completing the first and second scans, computer system 103 conveys results of the first and second scans to repository zone 107 for review by the system administrator. These conveyed results are stored in repository 160 included in repository zone 107. To maintain security levels for the data objects, computer system 103 conveys the results without conveying the data objects stored in the first and second databases to repository zone 107. Repository 160 may not have a level of access security that is as high as some security zones. Therefore, storing the actual data objects may violate security rules for storage of some types of data. Accordingly, computer system 103 may, in some embodiments, only convey information about a scanned data object without sending any data included in the scanned data object.

Computer system 103 determines, based on a type of data included in a particular data object in a given database, a risk analysis score for the particular data object. This risk analysis score indicates a level of compliance of storage of the particular data object with a corresponding one of security rules 130a or 130b. In some embodiments, computer system 103 determines to convey the risk analysis score to repository zone 107 in response to the risk analysis score satisfying a threshold risk value. For example, a risk analysis score may, in some embodiments, range from 0 to 100, with a score of '0' indicating a lowest level of risk to the security of a given data object and '100' indicating a highest level of risk. (But any suitable spectrum of scores, such as 0 to 1, is feasible.) A threshold may be set at 50 and computer system 103 conveys those risk analysis scores that are higher than 50. The threshold may be set by the system administrator, by a government or industry regulation, by a statistical analysis of the risk analysis scores, or by any other suitable process. In various embodiments, the threshold may be set individually for each security zone, or may be set to a single value for all security zones in enterprise computing system 100.

Use of such a technique as described in regards to FIG. 1 may allow for a scalable security scanning solution that allows for scans to be configured for respective security zones while consolidating results into a central repository. This technique may provide flexibility for system administrators who are responsible for one or more security zones to set rules appropriate to the security needs of each security zone. Furthermore, consolidating results using risk analysis scores may avoid security issues in the central repository since no secure data is sent to the repository. The repository allows for system administrators or other authorized entities to have access to risk analysis from across an enterprise computing system, while reducing a burden on respective system administrators to share local risk results from each security zone.

It is noted that the embodiment of FIG. 1 is merely an example for demonstration of disclosed concepts. In other embodiments, the illustrated enterprise computing system may include a different combination of elements, including additional elements. For example, computing devices 101a and 101b may correspond to a same physical computing device in some embodiments. Other embodiments may include additional security zones with a respective one or more databases and respective sets of security rules.

The enterprise computing system of FIG. 1 illustrates how a computing system may perform security scans across multiple security zones and consolidate results into a central repository zone. Such security scanning systems may be implemented using a variety of techniques. In FIG. 2, one such security scanning system is described.

Moving to FIG. 2, a block diagram of an embodiment of a risk analysis scanning system is shown. Risk analysis scanning system 200 includes computing device 101, database 110, and repository 160 which may, in various embodiments, correspond to the similarly numbered elements in FIG. 1, and function, therefore, as described in regards to FIG. 1. Repository 160 is coupled to risk analysis database 270. Computing device 101 is configured to perform a security scan of database 110, utilizing a series of processes: identification process 210, conversion process 220, scanning process 230, and risk determination process 240. Results of the security scan are passed to control process 250, performed by repository 160.

Before computer device 101 can start a risk analysis scan, a system administrator or other authorized entity stores a set of security rules 130 that define restrictions for data objects 115 maintained within security zone 105. Security rules 130 may be stored in any suitable memory system, such as a storage drive for computing device 101, a storage device that includes database 110, a universal serial bus (USB) flash drive maintained by the system administrator, and the like. The stored security rules 130 may be set by the system administrator based on company practices, industry standards, government regulations, and so forth. In some cases, security rules 130 may be modified based on updated practices/standards/regulations and/or knowledge gained from known data breech occurrences.

In some embodiments, one or more scan models 235 may be used by computing device 101 to determine how data objects 115 are scanned. While security rules 130 establish what types of data objects 115 are permissible to be stored in database 110 and criteria for how each permitted data object 115 is to be stored, scan models 235 establish criteria for which types of data objects 115 are scanned and a type of scan to perform on each type. For example, security rules 130 may establish that email addresses are permitted to be stored in a password protected file on database 110. A scan model used by computing device 101 to set criteria for scanning email addresses, causes computing device 101 to search data objects 115 to identify files that include email addresses, and then to perform a test to verify that the identified data objects are password protected.

In a different security zone, a different set of security rules establishes that a data object that includes an email address must be encrypted using a particular encryption algorithm before being stored in the respective database. A scan model that sets criteria for scanning email addresses in this different security zone causes a computing device to search data objects in a corresponding different database to identify files that include email addresses, and then to perform a test to verify that the identified data objects are properly encrypted.

As illustrated, after security rules 130 and scan models 235 have been established and stored, computing device 101 receives an indication to begin a risk analysis scan of database 110. In various embodiments, risk analysis scans may be performed by computing device 101 at regular timed intervals, in response to a change to database 110, in response to a start signal from control process 250, in response to a determination that a previous risk analysis scan has completed, and so forth. In some embodiments, computing device 101 initiates a risk analysis scan in response to a determination that one or more processors in computing device 101 have been idle for an amount of time, or that a sufficient amount of processing bandwidth is otherwise available for performing the scan.

In response to the indication, computing device 101 performs, within security zone 105, a risk analysis that includes applying the set of security rules 130 to a randomly selected set of data objects 115 stored in database 110 within security zone 105 to determine whether the selected data objects 115 comply with the set of security rules 130. Computing device 101 begins the risk analysis by performing identification process 210 to identify data objects 115 from within database 110 that will be scanned.

Performing the risk analysis further includes converting the stored data objects 115 from a particular data format to a common data format, different from the particular data format. In some embodiments, data may be stored in database 110 using any number of a variety of data formats. In order to simplify the scanning process, computing device 101 uses conversion process 220 to convert data objects 115 from one or more particular data formats into the common data format, thereby generating converted data objects 215. The common data format may be selected to improve a speed of execution of the risk analysis scan and/or to improve an accuracy of the scan results.

Computing device 101 scans converted data objects 215 using scanning process 230. Scanning process 230 utilizes scan models 235 to determine if sensitive information is being stored in database 110 in compliance with security rules 130. In some embodiments, performing the risk analysis includes initiating a particular number of scanning processes, each scanning process performing a scan on a portion of the selected data objects. The particular number of scanning processes 230 to initiate is based on an available bandwidth of computing device 101. Accordingly, during times of low utilization of computing device 101, a plurality of scanning processes 230 may be initiated, thereby allowing a greater number of data objects 115 to be scanned. In some embodiments, computing device 101 determines a number of data objects 115 that have been added or modified since a most recent scan was performed, and based on the number of modified data objects, adjusting the particular number of scanning processes. In addition to scanning process 230, a plurality of identification processes 210 and/or conversion processes 220 may be initiated when processing bandwidth is available.

As previously disclosed, database 110 may include a very large number of data objects. In some embodiments, performing the risk analysis further includes selecting, at random, a subset of converted data objects 215, and scanning the subset of converted data objects 215 to determine whether the converted data objects 215 comply with the set of security rules 130. The random selection, therefore, may occur at any combination of identification process 210, conversion process 220 or scanning process 230.

Results of a given risk analysis include a confidence score 245 that indicates a probability that a corresponding data object is a particular type of data object. For example, if a particular one of data objects 115 is encrypted, the scanning process may be performed without decrypting the data object. Accordingly, the scanning process may determine a probability that the particular data object includes sensitive information such as email addresses or credit card information. In some embodiments, a plurality of confidence scores 245 may be generated for a given data object, each confidence score corresponding to a respective type of sensitive information. The results of the given risk analysis further include a risk score 243 that indicates an associated level of risk that the corresponding data object is vulnerable to misuse. For example, scanning process 230 may determine that a particular data object has a confidence score 245 corresponding to a 70% likelihood that a credit card number is included. Based on security rules 130 for storing a credit card number, scanning process 230 may further determine that the data object is only password protected whereas the corresponding security rule 130 indicates that credit card numbers are only to be stored in database 110 if a particular encryption algorithm is used on the data object that includes the credit card number.

It is noted that both confidence scores 245 and risk scores 243 may be implemented using any suitable scale of values, with either higher or lower scores indicating corresponding increases in confidence and/or risk. For example, in some embodiments, "low," "medium," or "high" may be used to represent the scores. In other embodiments, scales from 0-1, 0-10 or 0-100 may be utilized.

Computing device 101, using risk determination process 240, transmits, from security zone 105, metadata 247 that identifies results of the risk analysis to a repository zone for presentation to a user. Risk determination process 240 conveys metadata 247 to control process 250 that is performed by a computing device in repository 160. In various embodiments, metadata 247 may be stored within a storage medium included in repository 160 or in a separate database such as risk analysis database 270. Risk analysis database 270 may be accessible by one or more system administrators, such as any system administrator that manages a security zone that scans and sends risk analysis data to the database. The collected metadata from various security zones is capable of being analyzed to identify various levels of risk and to track information storage within an enterprise computing system to determine if storage rules are being properly followed.

To protect sensitive information, the transmitted metadata 247 does not include the corresponding data objects 115 that are stored in the database. Metadata 247, however, includes confidence score 245 and risk score 243. Metadata 247 may also include, for example, identification data for the data objects that include information that may be at risk. Such data can be used by a system administrator to locate the data object in database 110 and modify the data object such that sensitive information is properly stored in accordance with security rules 130. For example, the system administrator may encrypt the data object, or may contact an owner of the data object to inform them of the at-risk information and request the owner to correctly store the data object.

In some embodiments, computing device 101 sends metadata 247 in response to a determination that the corresponding risk score 243 satisfies a particular threshold score. The risk score 243 may be further weighted using the associated confidence score 245. Such threshold scores may be established by the system administrator. In addition, threshold scores may be set to different values for each security zone in an enterprise computing system.

It is noted that the risk analysis scanning system of FIG. 2 is merely an example. In other embodiments, the risk analysis may be performed using a different number of processes. In some embodiments, different processes may be combined, for example, identification and conversion processes. Although a single computing device is shown in FIG. 2, the risk analysis may be performed by a plurality of computing devices. For example, some processes, such as the identification and conversion processes may be performed by one computing device while the scanning process is performed by another computing device. A third computing device may be used to perform the risk determination process.

It is also noted that the processes described in FIG. 2 may be implemented as program instructions included a software program. Such a software program may be stored in a non-transitory, computer-readable medium having program instructions stored thereon that are executable by the computing device to cause the operations described with reference to the processes shown in FIG. 2.

In the descriptions of FIGS. 1 and 2, a risk analysis scan is described as a procedure to determine if information is stored in accordance with associated security rules. Security rules may include a broad spectrum of data types and criteria. In addition, scan models are described in the description of FIG. 2 as being used to determine what types of data objects should be included in a scan. Examples of a set of security rules and a set of scan models are presented below in regards to FIG. 3.

Turning to FIG. 3, two tables depicting respective examples of a set of security rules and a set of scan models are illustrated. As described above, security rules establish what types of data objects are permissible to be stored in a particular database and criteria for how each permitted data object is to be stored. Scan models establish criteria such as the types of data objects that will be scanned as well as a type of scan to perform on each established type. Security rules 130 includes five rules 330*a*-330*e*, each rule identifying a type of information that may be found in a data object, such as data objects 115 in FIGS. 1 and 2. Each rule further includes a respective criterion for storing the corresponding type of information. Scan models 235 includes four models 335*a*-335*d*, each model identifying a type of data object and respective criteria for scanning the corresponding data object type. Security rules 130 and scan models 235 may be applied to one or more databases within a given security zone, such as security zone 105*a* or 105*b*.

A particular security rule specifies a respective level of security to be enforced on a data object matched to the particular classification. In the example of security rules 130, rule 330*a* is directed to email address information. Rule 330*a* permits storage of email address information without further restrictions. Rule 330*b* is directed to login credentials (e.g., a username and password combination), and permits storage of login credentials if they are encrypted. Rules 330*c* and 330*d* are directed to home address and telephone numbers, respectively, and similarly permit their storage when the information is encrypted. Rule 330*e* establishes that credit card data is restricted from storage in a database governed by security rules 130. Although the storage security criteria depicted by rules 330*a*-330*e* are simply "permitted," "encrypted," and "restricted," it is contemplated that, in other embodiments, additional criteria and/or more specific criteria may be included in a given one of security rules 130. For example, encryption criteria may further include a type of encryption algorithm, such as Advanced Encryption Standard (AES) or Rivest-Shamir-Adleman (RSA). Rule 330a, for example, may include further criteria such as email addresses are permitted without encryption unless the email address is further used as part of a set of login credentials, or is used for password recovery.

A particular model of scan models 235 specifies a type of data object and one or more criteria for scanning that type of data object. As shown, model 335a indicates that media files are not scanned (e.g., video and audio files may be beyond a scope of a particular risk analysis). Model 335b establishes that encrypted files are scanned for credit card data. Since, per security rules 130, other information is allowed to be stored if encrypted, the other types may be skipped within encrypted files. Model 335c calls for a default scan for text files. A default scan may, for example, include scanning for all types of information. Model 335d establishes that home addresses and telephone numbers be scanned for within an email contacts file. For example, a contacts file may include fields for limited types of information, and therefore, may exclude information such as credit card data.

During a risk analysis scan, a computing device compares the specified level of security for the particular data object to a security level of the first security zone. Referring to FIG. 1, for example, computing device 101a, based on scan models 235, scans an encrypted file stored in database 110a for credit card data. If indications of credit card data are detected in the encrypted file, then a risk score is determined based on security rules 130. For example, if the encryption algorithm used on the file is considered strong, the risk of discover and/or misuse of the credit card data may be scored low. A confidence score reflects a level of confidence that the detected data is actually credit card data. If the scan of the encrypted file does not include decrypting the file, then the credit card data may be detected based on hints that the encrypted file includes credit card data, such as a particular data pattern that is indicative of a 16-digit number.

In some embodiments, a new security rule is added to a security zone without interrupting performance of a particular scan currently in progress. Each security rule 330a-330e may be treated by a computing device as an independent object, allowing additions to be made without interrupting risk analysis scans that are in progress. Scan models 335a-335d may be managed in a similar manner. In response to determining that the particular scan has completed, the computing system performs, within the security zone, a new scan of the respective database using the new security rule. In such embodiments, the computing device detects that a new scan model or new security rule has been added and may initiate a new scan using the added rule or model. By allowing such real-time updates to the security rules and scan models, a risk analysis scan may be executed frequently, or continuously as a background process in an enterprise computing system, while still allowing system administrators to make changes to the rules and models that govern the scans.

It is noted that the security rules and scan models depicted in FIG. 3 are merely examples. The depicted rules and models have been simplified for clarity. In other embodiments, the rules and models may include more detailed criteria for establishing the operation of a risk analysis. In addition, the rules and models are shown as text values. In some embodiments, various options may be assigned identifiers (e.g., alpha-numeric or binary encoded) to be used in place of text values.

Risk analysis systems as described above, may be operable to perform a variety of methods. FIGS. 4-7, described below, provide examples of such methods.

Proceeding to FIG. 4, a flow diagram illustrating an example method 400 for performing a security risk analysis is depicted, according to some embodiments. In various embodiments, method 400 may be performed by computer system 103 of FIG. 1 to perform a risk analysis of databases 110a and 110b. For example, computer system 103 may include (or have access to) a non-transitory, computer-readable medium having program instructions stored thereon that are executable by computer system 103 to cause the operations described with reference to FIG. 4. Referring collectively to FIGS. 1 and 4, method 400 begins in block 401.

At block 410, in the illustrated embodiment, method 400 includes maintaining a first database within a first security zone having a first set of security rules, wherein the first set of security rules defines restrictions for storing data objects within the first security zone. Security zone 105a includes database 110a in which data objects 115a-115c are stored. Storage of data objects 115a-115c is governed by security rules 130a. Security rules 130a includes indicators for one or more types of information and corresponding criteria that govern how that type of data is stored in database 110a.

Method 400, at block 420, includes maintaining a second database within a second security zone having a second set of security rules, wherein the second set of security rules defines restrictions for storing data objects within the second security zone. Database 110b is included within security zone 105b and is governed by security rules 130b. Security rules 130b, in a similar manner as security rules 130a, includes one or more rules that establish how various types of information included in data objects 115d-115f are permitted to be stored in database 110b. In some embodiments, security rules 130a and 130b may be different.

Method 400 further includes, at block 430, performing, by a computer system within the first security zone, a first scan of the first database to determine whether a randomly selected first group of data objects stored in the first database comply with the first set of security rules. Computer system 103, as illustrated in FIG. 1, includes computing devices 101a and 101b. Computer system 103 uses computing device 101a to perform a risk analysis scan of database 110a. This risk analysis scan detects various types of information included in data objects 115a-115c and determines if the detected information is stored in accordance with security rules 130a.

At block 440, method 400 further includes performing, by the computer system within the second security zone, a second scan of the second database to determine whether a randomly selected second group of data objects stored in the second database comply with the second set of security rules. In a similar manner as block 430, computer system 103 uses computing device 101b to perform a risk analysis scan of database 110b, determining if detected information in data objects 115d-115f is stored in accordance with security rules 130b. It is noted that the risk analysis scans of blocks 430 and 440 may be performed by a plurality of processes as shown in FIG. 2 and described above. In some cases, dependent upon respective available processing bandwidths of computing devices 101a and 101b, multiple processes may be initiated to improve a speed and/or accuracy of the respective scan.

Furthermore, method 400 includes, at block 450, conveying, by the computer system, results of the first and second scans to a repository zone for review by an administrator, wherein the results are conveyed without conveying the data objects stored in the first and second databases to the repository zone. Results from each risk analysis scan performed in blocks 430 and 440, may include generation of one or more risk scores for each of data objects 115a-115f. A composite risk score may be compiled for data object having multiple risk scores. This composite risk score may be an average of the multiple risk scores or may be a worst-case (highest or lowest, depending on a respective risk scale). The risk score, along with other metadata that identifies the data object corresponding to the risk score, may be sent to repository 160 that is external to security zones 105a and 105b. Since repository 160 is external to security zones 105a and 105b, the metadata sent to repository 160 does not include any sensitive information included in any of data objects 115a-115f.

In some embodiments, the risk score for each data object 115a-115f is compared to a threshold value, and only metadata corresponding to risk scores that satisfy the threshold are conveyed to repository 160. Setting a threshold for conveying scan results may result in less data being sent to repository 160 which may reduce an amount of storage memory used by repository 160 and/or reduce a burden on system administrators in charge of monitoring the results sent to repository 160. Furthermore, in addition to the risk score, a corresponding confidence score may be determined for each scanned data object 115a-115f. The confidence score indicates a level of confidence that a respective scanned data object includes a type of information that is governed by the respective set of security rules. For example, if a security rule places a limitation on how bank account information is stored, then a confidence score for data object 115b indicates a level of confidence that information scanned in data object 115b includes bank account information. Risk scores may be weighted using the respective confidence scores before being compared to the threshold values. The method ends in block 490. In some embodiments, method 400 is repeated continuously or periodically.

It is noted that the illustrated example of method 400 includes elements 401-490. While these elements are shown in a particular order for ease of understanding, other orders may be used and additional elements may be included. For example, blocks 410 and 430 may be performed concurrently with blocks 420 and 440. In some embodiments, blocks 430 and 440 may be performed iteratively, for example, periodically or continuously. Block 450 may, in some embodiments, be performed at the end of each iteration of block 430 and block 440. In other embodiments, block 450 may be performed after a particular amount of time has elapsed since a previous performance of block 450.

Moving now to FIG. 5, a flowchart of an embodiment of a method for performing a risk analysis scan within a given security zone is illustrated. Method 500 may be performed by a computer system coupled to a database in the given security zone, such as computing devices 101a and 101b in FIG. 1. For example, computing device 101 in FIG. 2 may access a non-transitory, computer-readable medium having program instructions stored thereon that are executable by computing device 101 to cause the operations described in regards to FIG. 5. Referring collectively to FIGS. 2 and 5, method 500 begins in block 501.

At block 510, method 500 includes storing a set of security rules defining restrictions for data objects maintained within a security zone. As shown in FIG. 2, security rules 130 are included in security zone 105. In various embodiments, security rules 130 are stored within a storage memory included in computing device 101, within a storage device that includes database 110 or in a different storage device accessible by computing device 101, such as a USB flash drive or network storage drive. Security rules 130, as previously described, include one or more set of criteria establishing permissions for storing various types of information within database 110. In addition, computing device 101 may access scan models 235, stored in a similar location as security rules 130.

Method 500 further includes, at block 520, performing, within the security zone, a risk analysis that includes applying the set of security rules to a randomly selected set of data objects stored in a database within the security zone to determine whether the selected set of data objects comply with the set of security rules. Computing device 101, as shown, performs a risk analysis scan of database 110 to determine whether information within data objects 115 is being stored in accordance with security rules 130. Computing device 101 may initiate and execute a variety of processes to perform this risk analysis. As shown in FIG. 2, for example, computing device 101 executes identification process 210 to identify data objects 115 that are capable of being scanned, and conversion process 220 to convert some or all of data objects 115 into a common data format used by scanning process 230. Computing device 101 performs scanning process 230, using scan models 235, to scan information included in one or more of converted data objects 215 for compliance with security rules 130. Based on the scanning, scanning process 230 generates metadata 247 for each converted data object 215 that is scanned, including a risk score 243 and a confidence score 245. Scanning process 230 further includes other metadata to identify a particular data object 115 that corresponds to a respective risk score 243 and confidence score 245.

At block 530, method 500 also includes transmitting, from the security zone, metadata identifying results of the risk analysis to a repository zone for presentation to a user, wherein the transmitted metadata does not include the data objects stored in the database. Computing device uses risk determination process 240 to determine if a particular generated metadata 247 is to be conveyed outside of security zone 105 to repository 160. In some embodiments, all generated metadata 247 may be sent to repository 160. In other embodiments, for each generated metadata 247, the corresponding risk score 243 is compared to a threshold value and only sent to repository 160 if the threshold is satisfied. In some such embodiments, risk score 243 is weighted using the corresponding confidence score 245 before determining if the threshold is met. Such use of a threshold may reduce a workload on repository 160 as well as a workload on a system administrator managing repositoryl 60. It is noted that metadata 247 does not include any sensitive data that may be included in the corresponding data object 115. Method 500 ends in block 590.

In some embodiments, method 500 is repeated. For example, computing device 101 may continuously repeat method 500, or may repeat performance of method 500 based on a repetitive schedule, such as once a day, once a week, and the like. In other embodiments, performance of method 500 may be dependent on an available bandwidth of computing device 101. Computing device may, in some embodiments, initiate multiple processes that execute concurrently to perform the risk analysis. Such concurrent processing, with a number of active processes based on available bandwidth of computing device 101, may reduce an amount of time for completing a scan. Concurrent processing may also increase an accuracy of a risk analysis scan, for example, by increasing a number of data objects that are scanned.

It is noted that method 500 is one example. While the elements are shown in a particular order, other orders may be used and additional elements may be included. For example, the computing system may initiate multiple processes such that blocks 520 and 530 may overlap during repeated performances of the method.

Figure 6:
FIG. 6 depicts a flow diagram of an embodiment of a method for receiving, by a repository zone, results of a risk analysis scan.

Turning now to FIG. 6, a flow diagram of an embodiment of a method for operating a risk analysis repository is shown. In various embodiments, method 600 may be performed by repository 160 as shown in FIGS. 1 and 2 to receive risk analysis metadata generated from scans of one or more databases 110, and present results on a user interface. A computing device included in repository 160 may access a non-transitory, computer-readable medium having program instructions stored thereon that are executable by the computing device to cause the operations described in regards to FIG. 6. Referring collectively to FIGS. 1 and 6, method 600 begins in block 601.

At block 610, method 600 includes receiving, at a repository zone of a computer system, first metadata generated from a first risk analysis performed within a first security zone. The first risk analysis evaluates whether a first set of randomly selected data objects stored in the first security zone comply with a set of security rules, and the first metadata is received without removing the first set of database objects from the first security zone. Referring to FIG. 1, repository 160 receives the first metadata from after computing device 101a completing a risk analysis scan of at least one of data objects 115a-115c in database 110a, located in security zone 105a. The risk analysis compares actual storage methods used for storing data objects 115a-115c to security rules 130a that govern the storage of data objects 115a-155c.

Method 600 also includes, at block 620, receiving, at the repository zone, second metadata generated from a second risk analysis performed within a second security zone. The second risk analysis evaluates whether a second set of randomly selected database objects stored in the second security zone comply with a set of security rules, and the second metadata is received without removing the second set of database objects from the second security zone. In a similar manner as described for block 610, computing device 101b sends metadata generated in response to a risk analysis scan of data objects 115d-115f that are stored in database 110b that is located in security zone 105b. Computing device 101b uses security rules 130b to scan database 110b. In various embodiments, security rules 130a and 130b may be the same, may have some rules in common, or may be entirely different.

The metadata generated by computing devices 101a and 101b may be sent after a particular iteration of a respective risk analysis scan has completed. In other embodiments, metadata may be sent after at least one data object has been scanned, but while other data objects continue to be scanned. As is described above, sensitive data that is stored in the data objects is not included in the metadata sent to repository 160. Repository 160, therefore, may not include any sensitive data in some embodiments.

At block 630, method 600 further includes, based on the received first and second metadata, presenting, within the repository zone, a user interface depicting results of the first and second risk analyses. Repository zone 107 may include any suitable number of computing devices, as well as any suitable amount of storage memory. Repository 160 stores the metadata received from computing devices 101a and 101b in the storage memory. In addition, repository 160 presents results in a user interface displayed on one or more display devices (e.g., monitors) coupled to repository 160. In various embodiments, the presented user interface displays any suitable level of detail concerning the results. The user interface may display, for example, a notification that a risk analysis scan has completed for a particular security zone. In some embodiments, the user interface may display one or more metrics about the scan results, such as a number of data objects scanned, and/or a number of scanned data objects with resulting risk scores that satisfied the respective threshold.

A system administrator or other entity with proper authorization may access risk analysis results in repository 160 and generate one or more reports as desired. For example, a first entity may generate a report that provides results specific to a particular government regulation. A second entity may generate a report limited to data objects owned by employees belonging to a particular company division, or assigned to a particular project. Since the repository does not include sensitive data stored in the scanned data objects, a larger number of entities may be authorized to access repository 160, than would be if access to the repository were limited to only entities authorized to view all sensitive data. By providing a more open access, various system administrators and employee supervisors may be capable of viewing results and enforcing corrections if a violation to any security rule is detected.

At block 640, method 600 includes determining, based on the first metadata, that a particular data object in the first security zone does not comply with the set of security rules for the first security zone. In some embodiments, repository 160 includes additional capability for detecting that a particular one of the metadata received from computing device 101a violates security rules 130a and/or presents a level of risk that satisfies a secondary threshold that is more stringent than a local threshold used by computing device 101a. The determining may, as a first example, include identifying, using the first metadata, that a particular data object includes a credit card number. In some embodiments, repository 160 may be configured to detect any reception of metadata associated with a credit card number. In a second example, the determining includes identifying, using the first metadata, that the particular data object is an unencrypted telephone number. In such embodiments, repository 160 may be configured to detect any reception of metadata associated with any sensitive data that is stored without any encryption.

Method 600, at block 650, includes generating an alert for the particular data object. Upon detecting a particular violation of security rules within the received metadata, repository 160 generate an alert. Referring to the first example of the previous paragraph, the generating includes generating the alert in response to determining that the set of security rules for the first security zone restricts storage of credit card numbers. Referring to the second example, the generating includes generating the alert in response to determining that the set of security rules for the first security zone requires telephone numbers to be encrypted. The generated alert may be implemented by any suitable technique. For example, the alert may be an email sent to one or more entities, such as a system administrator in charge of the first security zone, and/or to a supervisor of an owner of the data object associated with the particular data object. The alert may be a pop-up window on a display coupled to repository 160. The alert may further include sending a text message or push notification to a mobile device of a system administrator and/or supervisor. The method ends in block 690.

It is noted, that method 600 is an example for demonstrating the disclosed concepts. Operations described for method 600 may be performed in a different order and/or additional operations may be included. For example, in an additional operation, the repository may send an acknowledgement to a computing device in response to receiving metadata.

Figure 7:
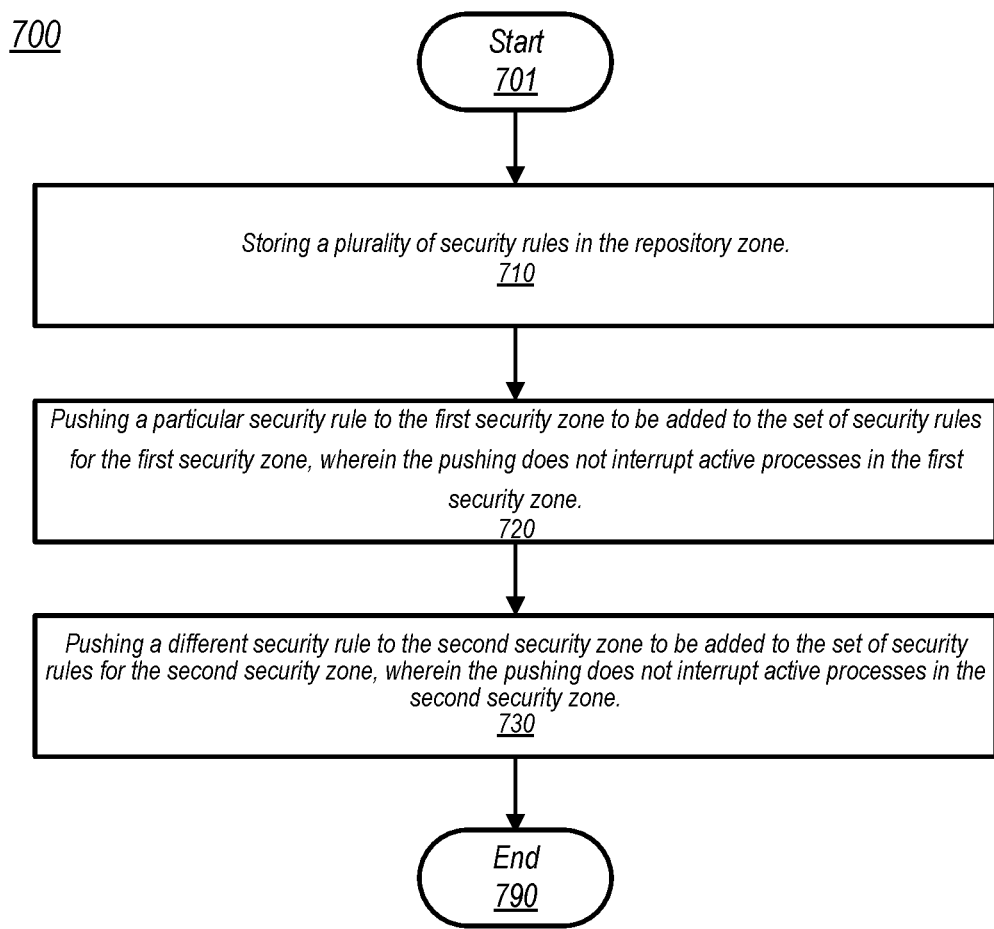
FIG. 7 illustrates a flow diagram of an embodiment of a method for updating, by a repository zone, security rules located within a plurality of security zones.

Proceeding now to FIG. 7, a flow diagram is presented of a method for modifying a set of security rules, according to some embodiments. Method 700, in some embodiments, is performed by a computing device in a repository zone, such as repository 160 in FIG. 1, to add a new security rule to security rules 130a and/or 130b. For example, a computing device included in repository 160 may include (or have access to) a non-transitory, computer-readable medium having program instructions stored thereon that are executable by repository 160 to cause the operations illustrated in FIG. 7. Referring collectively to FIGS. 1 and 7, method 700 begins in block 701.

Method 700, at block 710, includes storing a plurality of security rules in the repository zone. Repository 160, in some embodiments, stores and maintains a set of security rules to be used in one or more risk analysis scans performed by computing devices in security zones 105a and 105b. This set of security rules may be a master list, including every security rule utilized by any computing device that performs a scan in any corresponding security zone. For example, a system administrator responsible for data security compliance across enterprise computing system 100 may generate or obtain various security rules based on a variety sources. Such sources for the security rules include, for example, company policies, industry standards, various government regulations, published best practices, lessons learned from publicized data breeches, and the like.

At block 720, method 700 further includes pushing a particular security rule to the first security zone to be added to the set of security rules for the first security zone, wherein the pushing does not interrupt active processes in the first security zone. The system administrator may select a particular security rule from the master list of security rules to be added to security rules 130a. For example, permission may be added to database 110a to store bank account information. The particular security rule may establish that bank account information is permitted to be stored when encrypted using an AES 256 encryption algorithm. Repository 160 is configured to send the particular security rule to computing device 101a, causing computing device 101a to add the particular security rule to security rules 130a. If computing device 101a is in process of performing a risk analysis scan when the particular security rule is received, the current scan is completed using the prior set of security rules 130a. A next iteration of the risk analysis scan will include use of the added security rule.

Method 700 also includes, at block 730, pushing a different security rule to the second security zone to be added to the set of security rules for the second security zone, wherein the pushing does not interrupt active processes in the second security zone. In a similar manner as described for block 720, a different security rule is determined to be added to security rules 130b in security zone 105b. For example, the different security rule may place additional restrictions on storage of email addresses within database 110b, such as changing from allowing email addresses to be stored with only password protection to requiring encryption of email addresses. Repository 160 sends the different security rule to computing device 101b to be added to security rules 130b. As described above, if a risk analysis scan is in progress, the current scan is completed using the prior version of security rules 130b, and future iterations of the risk analysis scan are performed using the updated security rules 130b.

In some embodiments, repository 160 has access to add the new security rules to security rules 130a and 130b directly, without sending the new rules to either of computing devices 101a or 101b. In such embodiments, the addition of a new security rule to either of security rules 130a or 130b does not disrupt a scan that may be in progress within security zones 105a or 105b. Method 700 ends in block 790.

It is noted that the method illustrated in FIG. 7 is merely an example. In other embodiments, additional operations may be included, and/or illustrated operations may be performed in a different order. For example, operations 720 may be performed in the opposite order or may be performed concurrently. In some cases, only operation 720 or 730 may be performed to update a particular one set of security rules. Furthermore, it is contemplated that a similar method may be used to add scan models to a set of scan models stored in a particular security zone.

Figure 8:
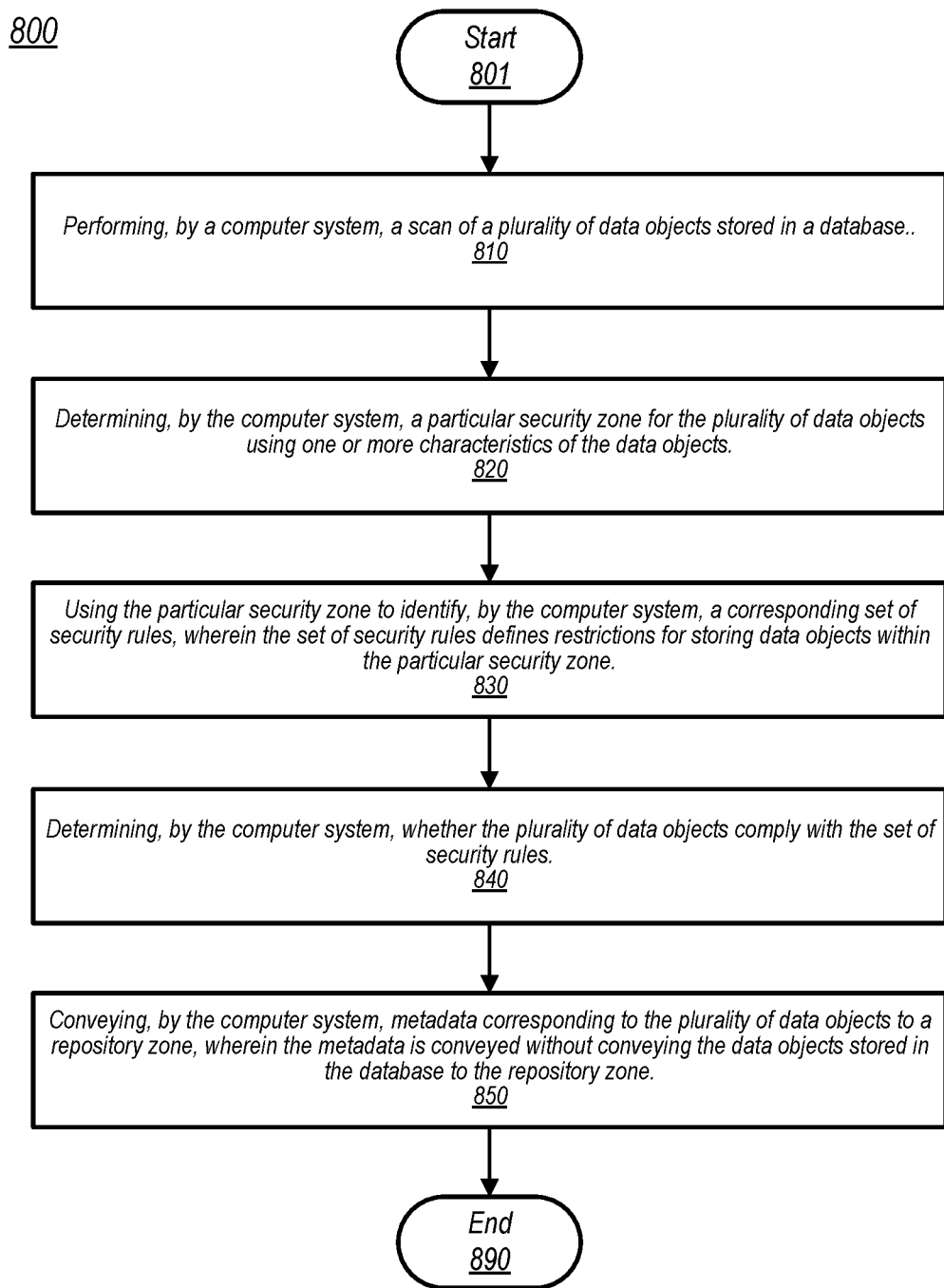
FIG. 8 shows a flow diagram of an embodiment of a method for performing a risk analysis scan on data objects stored in a particular database.
Figure 9:
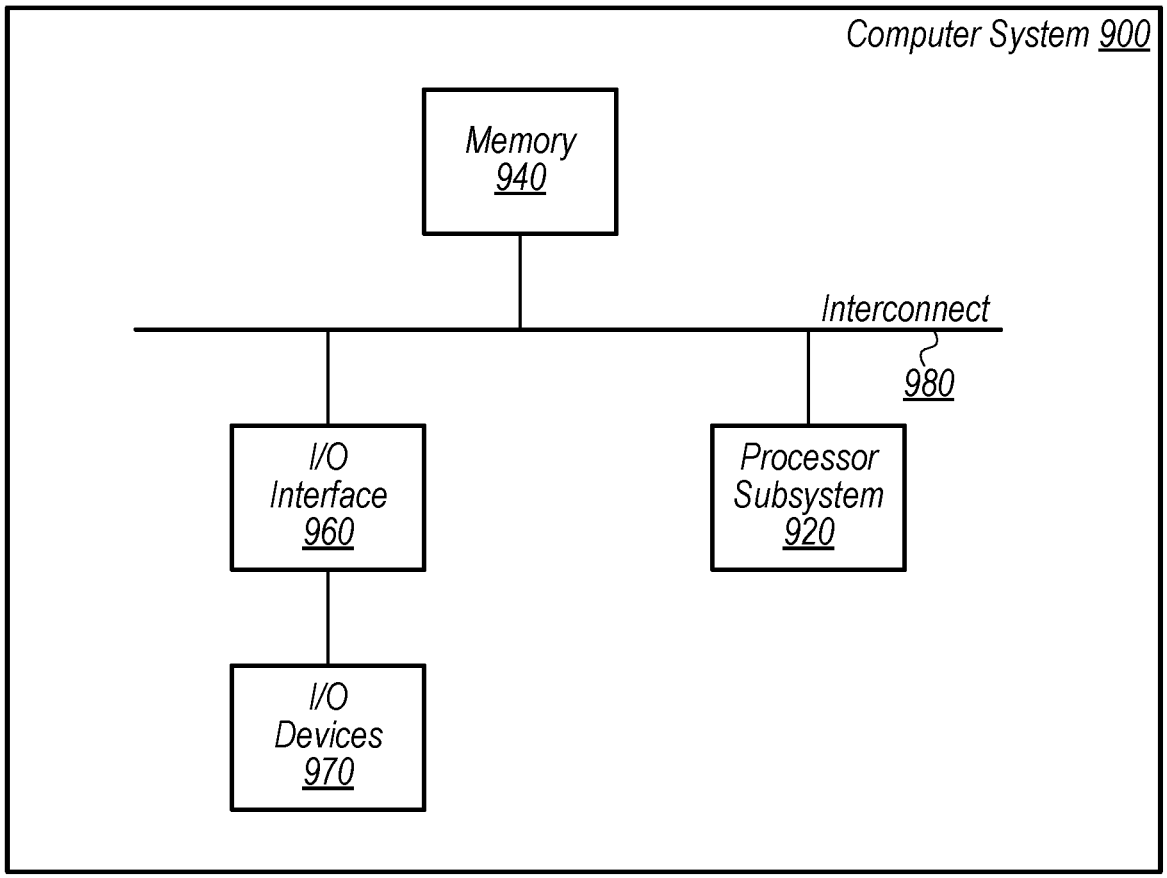
FIG. 9 is a block diagram illustrating an example computer system, according to some embodiments.

Moving to FIG. 8, a flowchart of another embodiment of a method for performing a risk analysis scan is illustrated. Method 800 may be performed by a computer system coupled to a database in a given security zone, such as computing device 101 in FIG. 2. Computing device 101, for example, may access a non-transitory, computer-readable medium having program instructions stored thereon that are executable by computing device 101 to cause the operations described in regards to FIG. 8. Referring collectively to FIGS. 2 and 8, method 800 begins in block 801.

At block 810, method 800 includes performing, by a computer system, a scan of a plurality of data objects stored in a database. Computing device 101, as shown, performs a scan of data objects 115 stored in database 110. In various embodiments, data objects 115 may include all data objects stored in database 110, or may be a subset of the stored data objects. If a subset is used, then this subset may be randomly selected from the total number of stored data objects.

Method 800 also includes, at block 820, determining, by the computer system, a particular security zone for the plurality of data objects using one or more characteristics of the data objects. Computing device 101, as illustrated, determines security zone 105 based on characteristics of data objects 115. Such characteristics include, for example, a location where each data object is stored, a file type of each data object, content of each data object, metadata stored with each data object, and the like. Using the one or more characteristics, computing device 101 identifies security zone 105 for the plurality of data objects. In some embodiments, computing device 101 may determine a respective security zone for each data object, while in other embodiments, a single security zone is identified for the plurality of data objects 115.

Furthermore, method 800, at block 830, includes, using the particular security zone to identify, by the computer system, a corresponding set of security rules, wherein the set of security rules defines restrictions for storing data objects within the particular security zone. Computing device 101, in some embodiments, accesses a stored set of security rules 130 that correspond to security zone 105. In other embodiments, computing device 101 receives security rules 130 from a different computing device associated with the determined security zone.

At block 840, method 800 includes determining, by the computer system, whether the plurality of data objects comply with the set of security rules. Computing device 101 scans each of data objects 115 to determine a type of data that in included in each of data objects 115. In some embodiments, one or more of data objects 115 may be encrypted. The determination of the data type is made without decrypting the encrypted data object. For each determined type of data included in a data object, a confidence score is determined as well as a risk score. As previously described, the confidence score indicates a level of confidence that the determined data type is accurate and the risk score indicates a level of compliance of the determined type of data to the rules for storing that type of data. For each scanned data object 115, an overall security score may be determined from one or more confidence and risk scores associated with each respective data object 115.

Method 800 further includes, at block 850, conveying, by the computer system, metadata corresponding to the plurality of data objects to a repository zone, wherein the metadata is conveyed without conveying the data objects stored in the database to the repository zone. Computing device 101 sends metadata associated with scanned data objects to repository 160. In some embodiments, the security score for each data object 115 is compared to a threshold value, and only metadata associated with data objects that satisfy the threshold value are conveyed to repository 160. Sensitive data included in a respective data object is not conveyed to repository 160. The method ends in block 890.

Referring now to FIG. 9, a block diagram of an example computer system 900 is depicted, which may implement one or more computing devices, such as computing devices 101a and 101b, and repository 160 of FIG. 1, according to various embodiments. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 to perform various operations described herein. System memory 940 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

Neural Networks for Detecting Sensitive Database Information

FIGS. 1-9 thus describe embodiments for scanning databases to identify data belonging to one of a plurality of specified output classes. FIGS. 10-17 described below are directed to particular embodiments for using neural networks to scan databases. As noted above, while the embodiments of FIGS. 10-17 are applicable to the embodiments of FIGS. 1-9, it is contemplated that the embodiments of FIGS. 10-17 may have broader applications.

Figure 10:
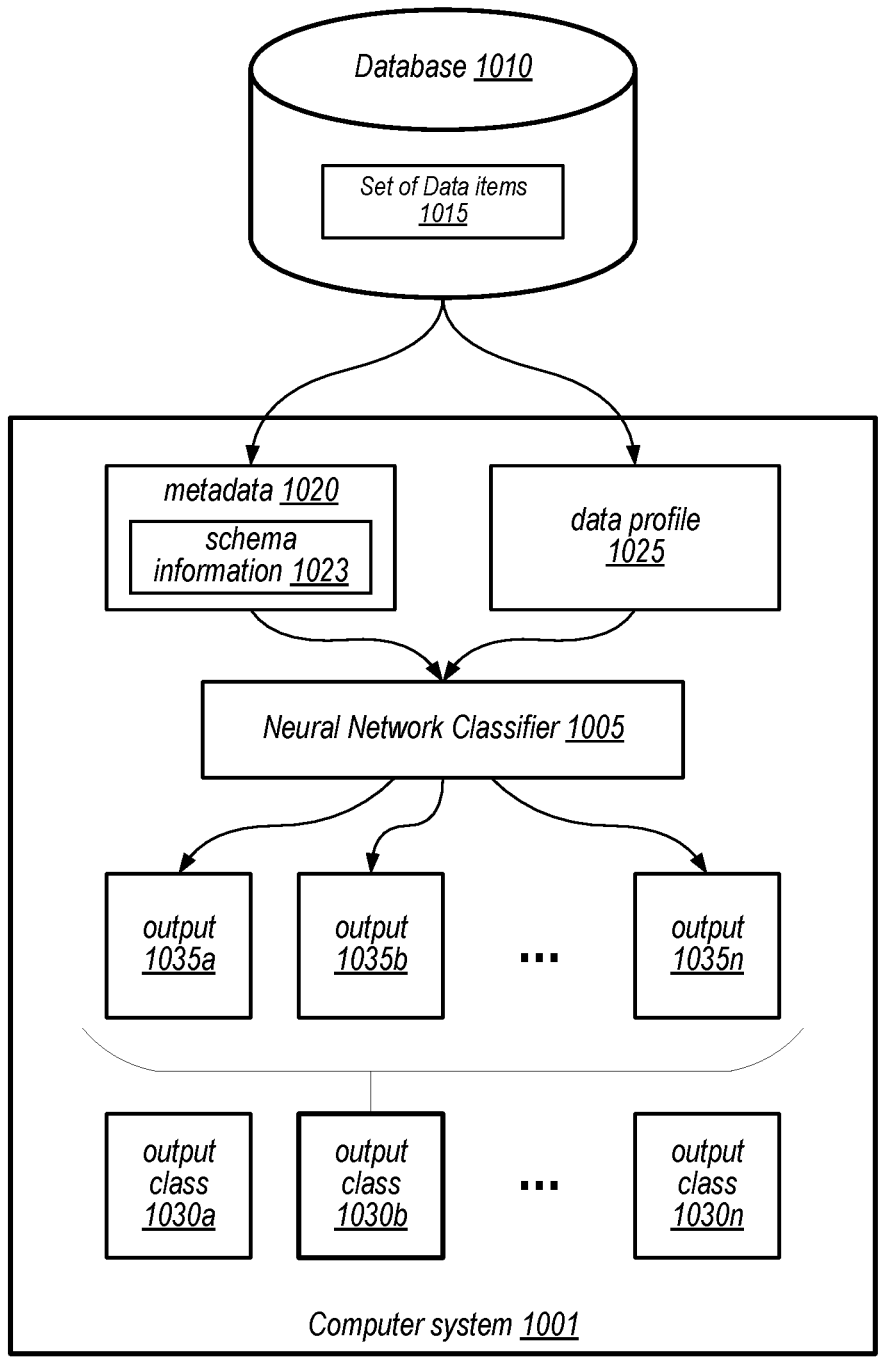
FIG. 10 depicts a block diagram of an embodiment of a computer network including a computer system and a database.

Moving to FIG. 10, a block diagram of an embodiment of a computer network is shown. Computer network 1000 includes computer system 1001 and database 1010 that includes a set of data items 1015. Computer system 1001 is operable to determine metadata 1020, including schema information 1023, and to generate data profile 1025. Using metadata 1020 and data profile 1025, neural network classifier 1005 generates outputs 1035a-1035n corresponding to output classes 1030a-1030n (collectively outputs 1035 and output classes 1030, respectively). In various embodiments, computer network 1000 may correspond to a single computer system 1001 with a storage memory capable of including database 1010, or may include a plurality of computer systems and multiple storage memories across which a variety of databases may be included. One or more computer systems 1001 included in computer network 1000 may correspond to computer system 900 in FIG. 9.

A system administrator or other user of database 1010 may desire to determine if any data, including set of data items 1015, stored in database 1010 corresponds to any of output classes 1030. Database 1010 may include gigabytes, terabytes, or even greater amounts of data. Accordingly, manually searching through data stored on database 1010 to identify data corresponding to particular data classifications may be time-intensive and prohibitive. Computer system 1001 is configured to perform an automated scan of database 1010 to identify the corresponding data. In various embodiments, computer system 1001 corresponds to a single computing device such as a laptop, desktop, server computer, mobile device, and the like, or to multiple computing devices coupled together on a local or wide area network and capable of performing respective portions of an automated scan.

As illustrated, computer system 1001 performs a scan to identify set of data items 1015 in database 1010 that correspond to one or more of output classes 1030. In some embodiments, computer system 1001 may correspond to computer system 103 in FIG. 1, with database 1010 corresponding to database 110a or 110b. In such cases, output classes 1030 may correspond to various types of sensitive data, such as, for example, user identity data, financial data, health data, proprietary corporate data and the like. Such types of sensitive data, as disclosed above, may have particular sets of security rules for storage in database 1010.

The scan may be performed to identify any stored data that does not satisfy the corresponding set of security rules.

The scan, as shown, includes multiple actions, beginning with determining metadata 1020 for a portion of database 1010, wherein metadata 1020 includes schema information 1023. Metadata 1020 includes information about a data item, excluding actual data included in the data item. For example, metadata 1020 may include information such as a timestamp for when the file was last edited, a size of the data item, identification of a user that created the data item, and the like. Schema information 1023 is a subset of metadata 1020 that includes information regarding a structure for how a data item is stored in database 1010. As used herein, "schema information" refers to metadata that describes a structure of a data item and/or a set of data items. For example, set of data items 1015 may correspond to a column of data items stored in a tabular format. In such an example, schema information includes row and column information for a particular data item in a table, a table name, a column and row headings, and other similar information. A process executing on computer system 1001 accesses the portion of database 1010 that includes set of data items 1015 and extracts metadata 1020, including schema information 1023, associated with set of data items 1015. Based on the extracted metadata, a set of features are generated. Each feature has a value that is indicative of a correlation between the extracted metadata and a respective one of the output classes 1030. As used herein, a "correlation" refers to a degree to which a characteristic of a data item matches a typical characteristic of a particular output class. For example, a feature may have a value between "0" and "1," with "0" representing no match between the extracted metadata and "1" representing a very close match. Additional details regarding the metadata extraction process will be disclosed below in reference to FIG. 12.

The scan further includes generating data profile 1025 for set of data items 1015 stored in the portion of database 1010. The generating of data profile 1025 includes performing, by a data profiling process executing on computer system 1001 a character-based analysis of set of data items 1015. As used herein, a "character-based analysis" refers to evaluating and comparing characteristics of character data (e.g., ASCII data) that is included in data items included in set of data items 1015. Characteristics may include character type (e.g., alphabetic, numeric, punctuation) and/or rates of occurrence for particular characters, or groups of characters. Algorithms for performing this data profiling process may include, for example, accessing a particular one of set of data items 1015 and determining one or more characteristics for each character in the particular data item. In one embodiment, an ASCII value associated with each character may be used to generate a composition of characters for the particular data item by classifying the character as alphabetic, numeric, punctuation, white space, etc., and then incrementing a count value corresponding to the resulting classification. In a different algorithm, a rate of occurrence may be determined for one or more predetermined characters by incrementing a corresponding count value each time one of the predetermined characters is identified in the particular data item.

As illustrated, data profile 1025 includes information regarding the composition of data included in each data item of set of data items 1015. The character-based analysis includes determining an alphanumeric composition of characters included in each data item of set of data items 1015. For example, the composition information may include a number of alphabetic characters as well as a number of numeric digits included in a given data item. The composition information is used to extract another set of features, each of these features being indicative of how well the composition information corresponds to a respective one of the output classes 1030. Further information regarding the data profiling process will be disclosed later in regards to FIG. 13.

As shown, the scan also includes identifying whether set of data items 1015 corresponds to one of the plurality of output classes 1030. To perform the identifying, multi-class neural network classifier 1005 is executed on computer system 1001. Neural network classifier 1005 is trained to perform the identifying using a plurality of features, including the features extracted from metadata 1020 and data profile 1025. Each of the extracted features corresponds to how a particular characteristic of set of data items 1015 matches a particular one of output classes 1030. Each of output classes 1030 is a particular classification of data. For example, output class 1030*a* may be user identification values (user IDs), 1030*b* may be passwords, 1030*c* may be credit card numbers, and so forth. A particular extracted feature may indicate how well a column name associated with set of data items 1015 matches known column names associated with passwords. Neural network classifier 1005 receives all of the extracted features for set of data items 1015 and generates a set of outputs 1035. Each of outputs 1035 correspond to a respective one of output classes 1030, such that output 1035*a* is a value indicative of how well set of data items 1015 matches characteristics of output class 1030*a*, the user ID class. Similarly, the value of output 1035*c* indicates how well set of data items 1015 matches characteristics of output class 1030*c*, the credit card number class.

The scan further includes identifying, based on outputs 1035 of neural network classifier 1005, a particular output class of output classes 1030 that corresponds to the set of data items. Neural network classifier 1005 evaluates outputs 1035 and identifies the one output 1035 that is most indicative of the corresponding output class 1030. As shown in the example of FIG. 10, neural network classifier 1005 selects output class 1030*b* as having the highest likelihood of matching set of data items 1015. Output class 1030*b* may be selected in response to output 1035*b* having the highest value. In some embodiments, values for some or all of outputs 1035 may be weighted differently based on an analysis of the extracted features. More information regarding the class identifying process, including neural network classifier 1005, will be discussed below in regards to FIG. 11.

In some embodiments, the scan may further include applying each of a set of rules to set of data items 1015 stored in the portion of database 1010. The set of rules may include a set of search strings and/or regular expressions for identifying particular character data included in each data item in set of data items 1015. In some embodiments, each rule of the set of rules is a regular expression corresponding to a particular one of output classes 1030. For example, one regular expression rule for identifying credit card numbers may look for a pattern of four strings of four digits each, with each string of four numerals separated by a space. Another regular expression for identifying credit card numbers may look for a string of sixteen numerals with no spaces. One set of rules may correspond to one output class 1030. One feature may be extracted for each set of rules applied to set of data items 1015, the extracted features indicating a correlation between set of data items 1015 and the respective set of rules. The plurality of features that are used by neural network classifier 1005 may include these features extracted from application of the set of rules.

It is noted that the computer network depicted in FIG. 10 is merely an example. In other embodiments, a different combination of functional blocks and processes may be included. For example, any suitable number of output classes may be included. Although a single database is illustrated, other embodiments may include any number of databases on which to perform a scan.

Figure 11:
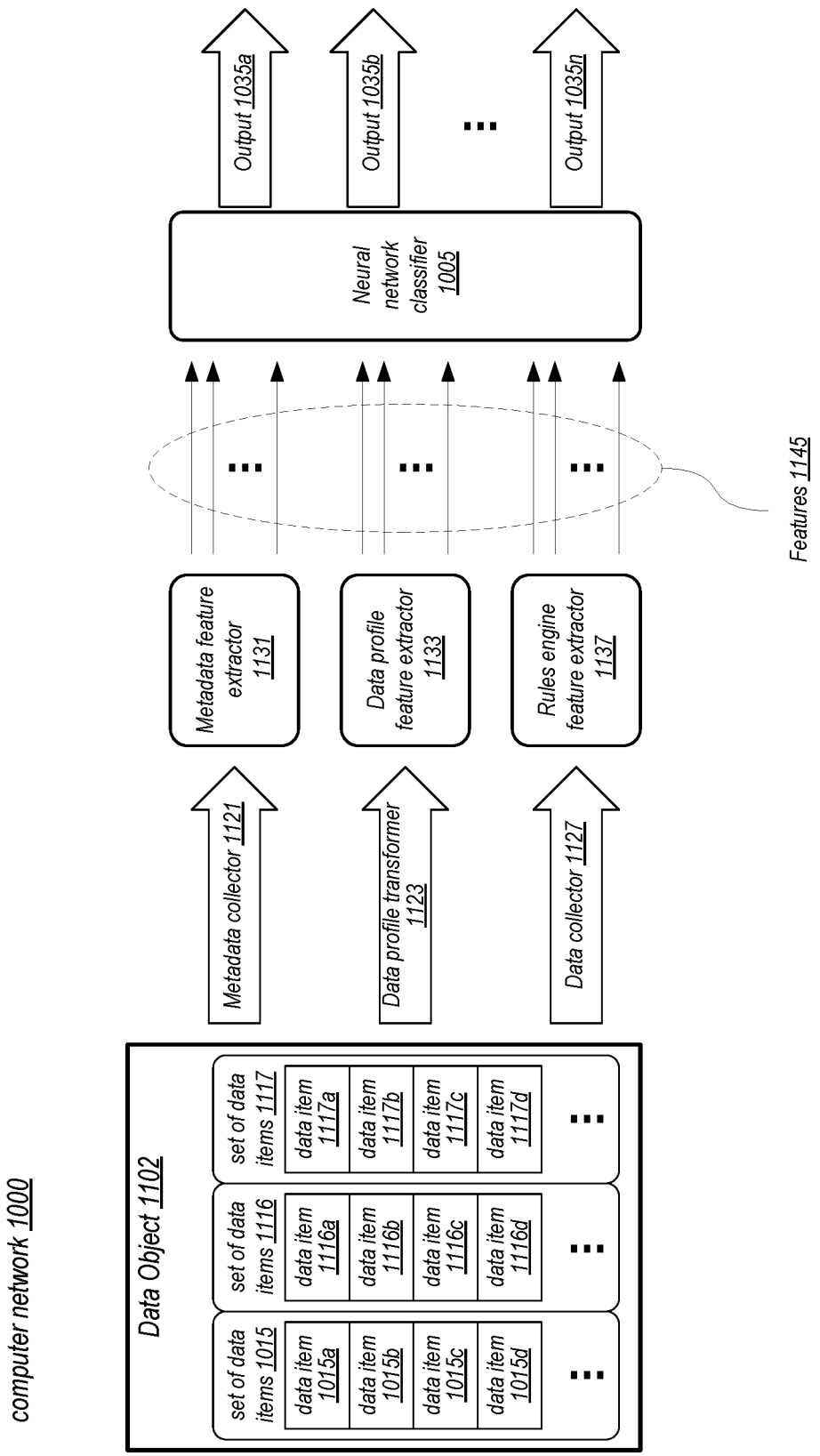
FIG. 11 illustrates a block diagram of an embodiment of a scan of a data object by a neural network classifier.

The computer network illustrated in FIG. 10 depicts one embodiment of a technique for scanning a database. The techniques depicted in FIG. 10 may be realized using a variety of implementations. In FIG. 11, additional details for one embodiment of the disclosed techniques are provided.

Turning to FIG. 11, another embodiment of computer network 1000 is shown. Computer network 1000 includes data object 1102 that further includes three sets of data items, set of data items 1015, set of data items 1116, and set of data items 1117. Three processes are used to extract various types of data regarding each of the three sets of data items. Metadata collector 1121 extracts metadata for use by metadata feature extractor 1131. Data profile transformer 1125 gathers data for data profile feature extractor 1135. Rules engine 1129 produces information that is used by rules engine feature extractor 1139. Features 1145 are generated by metadata feature extractor 1131, data profile feature extractor 1135, and rules engine feature extractor 1139 and sent to neural network classifier 1005. For each set of data items, neural network classifier 1005 generates an output 1035 corresponding to each of output classes 1030.

As illustrated, a computer system, such as computer system 1001 of FIG. 1, performs a scan to identify data items in a database, such as database 1010, that correspond to ones of output classes 1030. The database may include any suitable number of data objects, each data object including one or more sets of data items. In the illustrated example, data object 1102 is a table of data items. Three columns of the table are shown as respective sets of data items, including sets of data items 1015, 1116, and 1117. In other embodiments, a given set of data items may correspond to a row of a table, a linked list of items, or any other suitable grouping of data items. The scan includes performing several data extraction processes on data objects in the database, including performing metadata collector 1121, data profile transformer 1125, and rules engine 1129.

To perform metadata collector 1121, computer system 1001 determines metadata for a portion of the database, e.g. data object 1102, wherein the metadata includes schema information. Schema information includes information regarding the structure of data object 1102, such as, for example, a name and a size of data object 1102, a number of sets of data items included in data object 1102 and a number of data items included in each of the sets. The determined metadata is sent to metadata feature extractor 1131, which in turn, generates a portion of features 1145. For each set of data items in data object 1102, a set of features are generated, one feature for each of output classes 1030. Accordingly, for the three illustrated sets of data items (1015, 1116, and 1117), three sets of features are generated, each set of features includes a respective feature for each output class 1030. In the present example, the value of a particular feature is set to '1' if the metadata for a given set of data items is similar to metadata associated with the output class corresponding to the particular feature, and otherwise set to '0' if little or no similarity is determined.

Data profile transformer 1123 is performed by computer system 1001 by generating a data profile for each set of data items stored in data object 1102. Generating the data profile further includes performing a character-based analysis of each set of data items. The data profile includes information regarding types of data included in each data item of a given set of data items. For example, a data profile for set of data items 1015 may include information regarding an alphanumeric composition for each of data items 1015a-1015d. The data profile for a given set of data items is sent to data profile feature extractor 1133, which in turn, generates another portion of features 1145. In a similar manner as metadata feature extractor 1131, data profile feature extractor 1133 generates a set of features, one feature for each of output classes 1030. As described above, a value of '1' for a given feature indicates a strong correlation between the data profile and an associated data profile for the respective output class 1030, while a value of '0' indicates a weak correlation.

As shown, computer system 1001 performs data collector 1127 by comparing a plurality of regular expressions to set of data items 1015. Each of the plurality of regular expressions (also referred to herein as "regexes") includes a character pattern that is associated with a respective one of output classes 1030. For example, a regex for detecting an email address may search for a pattern of one or more alphanumeric characters followed by the "@" symbol, then followed by more alphanumeric characters, then followed by a suffix string such as ".com." Additional regexes for email addresses may look for other suffix strings, for example, ".net," ".org," ".gov," etc. Values indicating a degree of matching between a particular data item (e.g., data item 1015b) to a particular regex are sent to rules engine feature extractor 1137. Accordingly, a value may be generated for every combination of data item 1015a-1015n to each regex. In other embodiments, a value may be generated for every combination of data item 1015a-1015n to each output class 1030, with a respective value for a given output class 1030 being based on one or more regexes. In some embodiments, rather than sending a value for each data item 1015a-1015n, a single value (per regex or per output class 1030) may be sent for the entire set of data items 1015. Rules engine feature extractor 1137 determines a percentage match for set of data items 1015 to each output class 1030. These percentages are, in turn, used to generate a set of features for each set of data items. A given feature may be assigned a value of "0" or "1" depending if a respective percentage meets a threshold for matching an associated one of output classes 1030, with a "1" predicting a match and a "0" predicting no match.

After features 1145, associated with set of data items 1015 have been generated by each of metadata feature extractor 1131, data profile feature extractor 1133, and rules engine feature extractor 1137, computer system 1001 predicts whether set of data items 1015 corresponds to a particular one of output classes 1030. This predicting includes sending features 1145 that are based on the metadata, the data profile, and the comparison of the regexes to neural network classifier 1005. Neural network classifier 1005 generates outputs 1035a-1035n (collectively outputs 1035), based on the received features 1145. Each one of outputs 1035 corresponds to one of output classes 1030. The respective values of outputs 1035 are used to predict if one of output classes 1030 corresponds to set of data items 1015. In some embodiments, an output 1035 with a highest value is used to select the corresponding output class 1030 as the predicted match. For example, a set of outputs 1035 are generated for set of data items 1015. If output 1035b has the highest value, then set of data items 1015 is predicted as corresponding to output class 1030b. In other embodiments, an additional threshold may be used to determine if set of data items 1015 corresponds to any of output class 1030. For example, if output 1035b has the highest value out of a set of outputs 1035, but the value of output 1035b does not satisfy a particular threshold value, then neural network classifier 1005 may determine that set of data items 1015 does not correspond to any of output classes 1030.

In some embodiments, rather than predicting that the entire set of data items 1015 corresponds to a particular output class 1030, computer system 1001 predicts whether each data item of set of data items 1015 corresponds to a particular one of output classes 1030. Accordingly, in some embodiments, computer system 1001 uses neural network classifier 1005 to predict if, for example, set of data items 1015, as a group, corresponds to a particular output class 1030. In other embodiments, computer system 1001 performs neural network classifier 1005 for each data item in set of data items 1015 to predict, for example, that data item 1015a corresponds to output class 1030b, while data item 1015b corresponds to output class 1030n.

It is noted that some or all of the elements described in regards to FIG. 11, such as metadata feature extractor 1131, data profile feature extractor 1133, and rules engine feature extractor 1137, may be implemented as program instructions included a software program. Such a software program may be stored in a non-transitory, computer-readable medium having program instructions stored thereon that are executable by computer system 1001 to cause the operations described in reference to FIG. 11.

It is further noted that the embodiment of FIG. 11 is an example for illustrating the disclosed concepts. Variations to the example are contemplated, such as inclusion of a different number of feature extractors. Although three sets of data items are shown, any suitable number of data items may be included in a given data object.

FIG. 11 illustrates various processes used to generate the features that are used by the neural network classifier to generate the output values. These various processes may be implemented in multiple fashions. An example of an implementation of a metadata extraction process is shown in FIG. 12.

Figure 12:
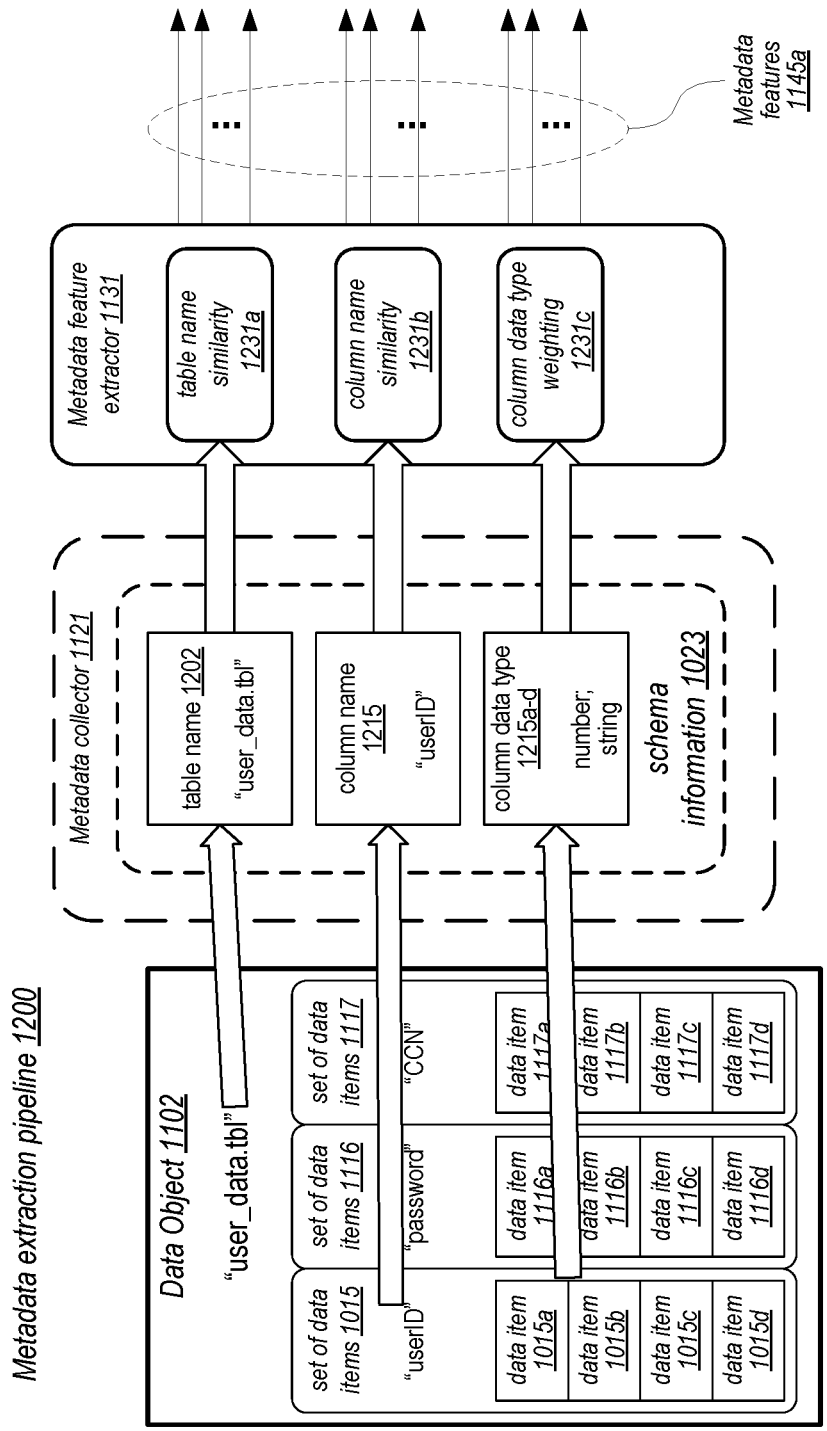
FIG. 12 shows block diagram of an embodiment of a metadata extraction pipeline.

Proceeding to FIG. 12, a block diagram of an embodiment of a process of extracting metadata associated with a set of data items is depicted. As shown, metadata extraction pipeline 1200 is utilized to retrieve various types of metadata associated with respective sets of data items included in data object 1102. Metadata collector 1121 retrieves the associated metadata and sends the collected metadata to metadata feature extractor 1131. Metadata feature extractor 1131 includes several processes for analyzing the collected metadata and generating a plurality of metadata features 1145a. Metadata features 1145a are a subset of features 1145 shown in FIG. 11.

As illustrated, data object 1102 is a table of data items, that includes a plurality of columns, wherein the sets of data items correspond to a respective one of the plurality of columns. Data object 1102 includes a table name, "user_data.tbl," and is shown with three columns with respective column names: "userID" corresponding to set of data items 1015, "password" corresponding to set of data items 1116, and "CCN" that corresponds to set of data items 1117. Each column of data is further shown with four respective data items. Each data item includes data of one or more types, such as numeric, alphabetic, and binary.

The associated metadata is retrieved by metadata collector 1121, including table name 1202, column name 1215, and column data type 1215a-d. This retrieved metadata is collectively referred to as schema information 1023, as the particular metadata corresponds to a scheme (e.g., a data structure) that is used for storing data object 1102 in database 1010. For se of data items 1015, for example, table name 1202 is set to "user_data.tbl," column name 1215 is set to "userID," and column data type 1215a-d includes numeric and string data types. This schema information 1023 is sent to metadata feature extractor 1131 in order to generate metadata features 1145a for set of data items 1015.

Metadata feature extractor 1131 includes three classifiers for generating metadata features 1145a: table name similarity 1231a, column name similarity 1231b, and column data type weighting 1231c. Each of output classes 1030 has a predefined list of common column names and common table names for that output class. Metadata feature extractor 1131 generates, for a particular output class 1030 (e.g., output class 1030a), a respective feature based on a comparison of schema information 1023 to the predefined list for output class 1030a. This generating is performed by applying a character-based neural network classifier to the predefined list of the common column names and to the common table names, respectively, for output class 1030a. Table name similarity 1231a is a character-based neural network classifier that identifies a particular one common table name based on the comparison of table name 1202 to the list of common table names for output class 1030a. One feature of metadata features 1145a corresponds to this comparison. For a given value of table name 1202, table name similarity 1231a generates a respective feature for each output class 1030. It is noted that, since table name 1202 is the same for all three sets of data items in data object 1102, table name similarity 1231a may only be performed once for each data object.

Column name similarity 1231b is another character-based neural network classifier that identifies a particular one common column name based on the comparison of column name 1215 to the list of common table names for output class 1030a. One feature of metadata features 1145a corresponds to this comparison. For a given value of column name 1215, column name similarity 1231b generates the respective feature using a prediction that the schema information matches one of the common column names on the list for output class 1030a. Column name similarity 1231b generates additional features of metadata features 1145a based on additional comparisons to lists corresponding to each of the remaining output classes 1030b-1030n.

Each output class 1030 has a predefined list of acceptable data types. Column data type weighting 1231c is a process that generates a feature for each output class 1030 that indicates whether column data type 1215a-d for set of data item 1015 includes an acceptable data type for the respective output class 1030. As shown, column data type 1215a-d indicates that set of data items 1015 includes number and string types of data. Column data type weighting 1231c generates a respective feature of metadata features 1145a for each output class 1030 based on whether each output class 1030 commonly includes both numeric and string types of data. Output classes 1030 that commonly include both types of data will receive a feature value of "1" while output classes 1030 that commonly include only numeric type data or only string type data may be assigned a value less than "1" (e.g., "0").

It is noted that the metadata extraction pipeline illustrated in FIG. 12 is merely an example. As shown, only three types of metadata are collected and analyzed. In other embodiments, additional or different types of metadata may be collected. For example, other types of metadata may include time stamps indicating a most recent access to the respective data items, a count value indicating a frequency of access to the data object, and other like metadata types.

FIG. 12 illustrates one example of a process used to generate features as part of a neural network classifier. As disclosed above, several processes are utilized to generate a set of features for input to a neural network classifier. FIG. 12 illustrates generation of features based on metadata of a data object. An example of a process for generation of features associated with a data profile of a set of data items is depicted in FIG. 13.

Figure 13:
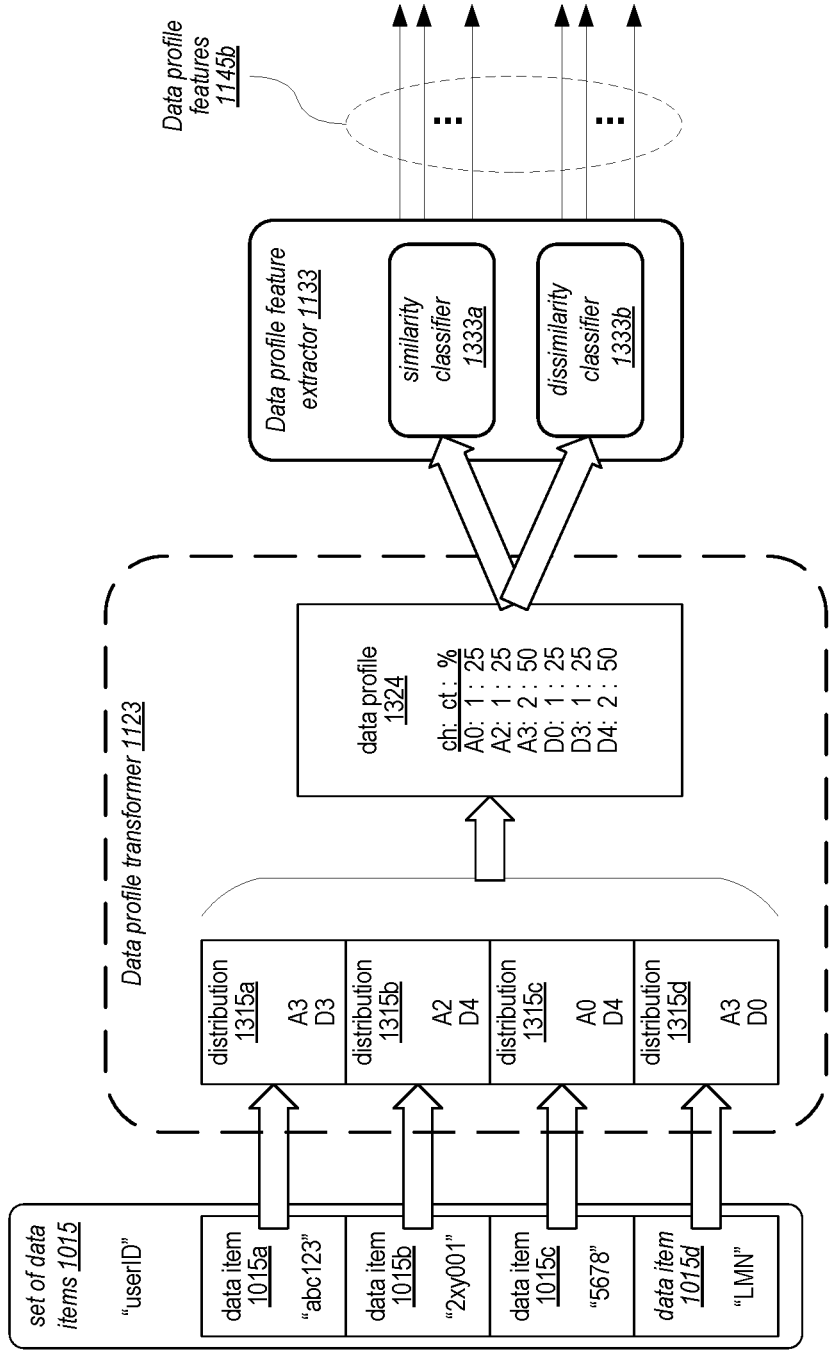
FIG. 13 depicts a block diagram of an embodiment of a data profile transformation pipeline.

Moving now to FIG. 13, a block diagram of an embodiment for generating a data profile for a set of data items is shown. As shown, data profile transformation pipeline 1300 is utilized, as part of the character-based analysis, to determine an alphanumeric composition of characters included in each data item of a set of data items (e.g. set of data items 1015) included in data object 1102. Data profile transformer 1123 determines a data profile based on the determined alphanumeric composition of the data items in a given set of data items and sends this data profile to data profile feature extractor 1133. Data profile feature extractor 1133 includes two processes for analyzing the data profile and generating a plurality of data profile features 1145b. In a similar manner as metadata features 1145a, data profile features 1145b are a subset of features 1145 shown in FIG. 11.

As illustrated, set of data items 1015 includes four data items 1015a-1015d, each one having an alphanumeric value, such as "abc123" for data item 1015a. For set of data items 1015, data profile transformer 1123 determines a distribution of character compositions of data items 1015a-1015d within the set. Determining the distribution includes determining a number of alphabetic characters and a number of numeric characters included in each data item of set of data items 1015. For example, distribution 1315a is an example of the character composition of data item 1015a which has a value of "abc123." As shown in distribution 1315a, this value include three alphabetic characters (represented as "A3") and three numeric digits (represented as "D3"). Similarly, distributions 1315b-1315d indicate that data items 1015b-1015d, respectively, include two alphabetic characters ("A2") and four numeric digits ("D4"), zero alphabetic characters ("A0") and four numeric digits ("D4"), and three alphabetic characters ("A3") and zero numeric digits ("D0").

Using the number of alphabetic characters and the number of numeric digits, data profile transformer 1123 determines a distribution of character compositions of the data items within set of data items 1015 to generate data profile 1324. As shown, distributions 1315a-1315d are used by data profile transformer 1123 to create data profile 1324 that indicates a percentage distribution for each of the included number of characters. Data profile 1324 indicates that one of the four data items 1015a-1015d, or 25%, include zero alphabetic characters, 25% include two alphabetic character, and 50% include three alphabetic characters. In addition, data profile 1324 indicates that 25% of the data items 1015a-1015d include zero digits, 25% include three digits, and 50% include four digits. This data profile 1324 is sent to data profile feature extractor 1133.

Data profile feature extractor 1133 includes two neural network classifiers for generating data profile features 1145b: similarity classifier 1333a and dissimilarity classifier 1333b. Data profile feature extractor 1133 applies data profile 1324 to similarity classifier 1333a, which is trained to identify similarities of the distributions indicated in data profile 1324 to common distributions associated with each of output classes 1030. For example, similarity classifier 1333a compares data profile 1324 to one or more common character distributions associated with output class 1030a. Similarity classifier 1333a generates one of data profile features 1145b with a value that indicates a degree of similarity between data profile 1324 and output class 1030. The generated feature may have a value in range from "0" to "1," with "1" indicating a perfect match and "0" indicating no similarities.

In a similar manner, data profile feature extractor 1133 applies the distribution of character compositions indicated by data profile 1324 to dissimilarity classifier 1333b, which is trained to identify dissimilarities of the distribution to each of output classes 1030. A separate one of data profile features 1145b is generated for each output class 1030 using data profile 1324. In various embodiments, dissimilarity classifier 1333b may use a same scale as used by similarity classifier 1333a ("1" indicating a perfect match and "0" indicating no similarities) or may reverse the scale with a "1" indicative of no similarities. Data profile features 1145b that are extracted from application of the distribution of character compositions to similarity and dissimilarity classifiers 1333a and 1333b, respectively, are included in features 1145 that are sent to neural network classifier 1005.

It is noted that the data profile transformation pipeline, as shown in FIG. 13, is an example for demonstrative purposes. Although the example only illustrates collecting alphabetic and numeric character data, others types of characters (e.g., special characters such as mathematical and punctuation) may also be collected and profiled in other embodiments. Two neural network classifiers are shown. In some embodiments, a different number may utilized, such as having separate classifiers for numeric data and alphabetic data.

FIGS. 12 and 13 illustrates two examples of processes used to generate a group of features from a set of data items, as part of a neural network classifier. As shown in FIG. 11, three processes may be utilized to generate the group of features. An example of a third process for generation of features based on a comparison of regular expressions to a set of data items is depicted in FIG. 14.

Figure 14:
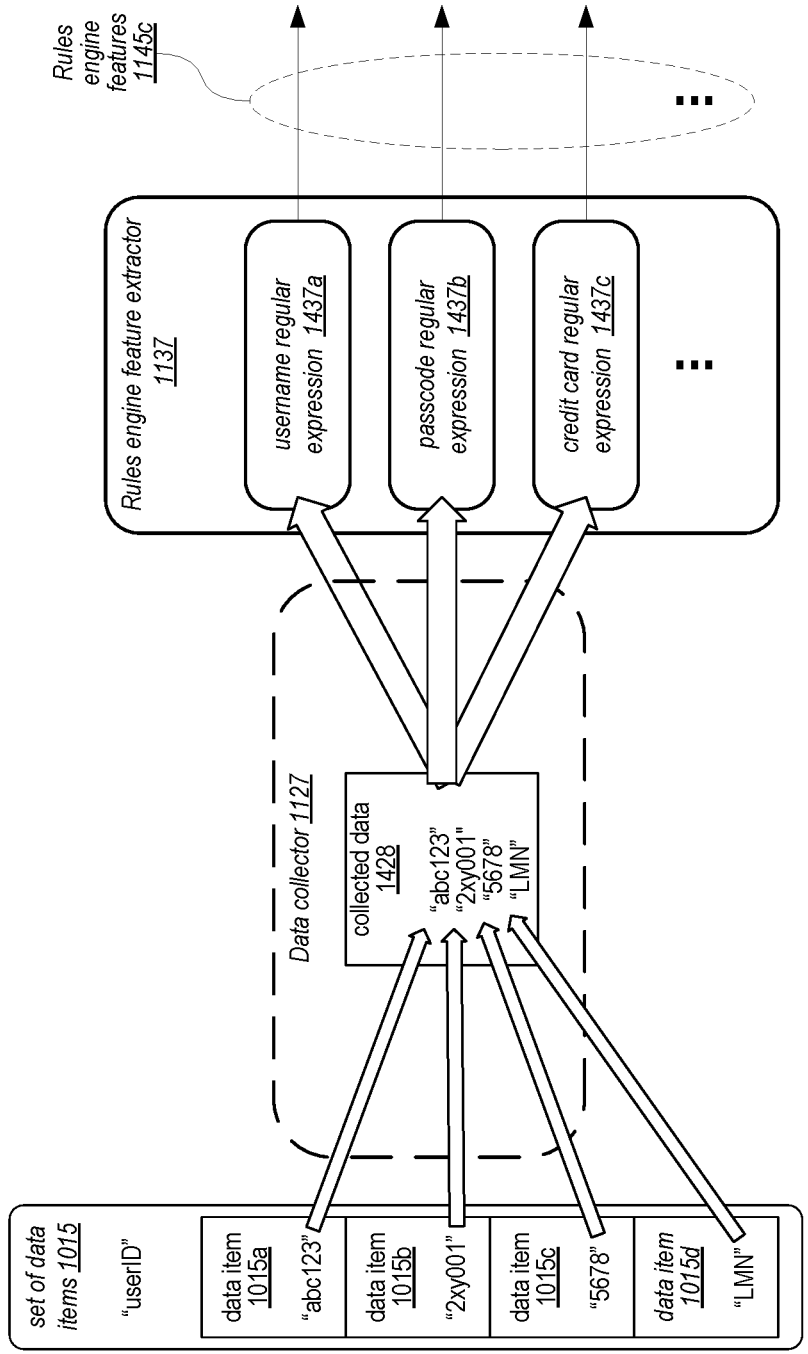
FIG. 14 illustrates a block diagram of an embodiment of a rules engine pipeline.

Turning now to FIG. 14, a block diagram of an embodiment for applying a rules engine to a set of data items is illustrated. As shown, rules engine pipeline 1400 is utilized, as part of the character-based analysis, to identify character patterns present in each data item of a set of data items (e.g. set of data items 1015) included in data object 1102. Data collector 1127 identifies values in each of data items 1015a-1015d, and sends the collected data 1428 to rules engine feature extractor 1137. Rules engine feature extractor 1137 includes a plurality of processes (three are shown in FIG. 14) for comparing collected data 1428 to patterns associated with each of output classes 1030. A plurality of rules engine features 1145c are generated as a subset of features 1145 shown in FIG. 11.

As disclosed above, a data profile includes an analysis of the composition of data values of data items in a set of data items, including a character count for different types of characters. Rather than character counts, rules engine pipeline 1400 compares a plurality of regular expressions to set of data items 1015 of data object 1102 that is stored in database 1010. Each regular expression of the plurality corresponds to one of output classes 1030, and is indicative of a pattern of characters that is common to the corresponding output class 1030. As shown, data collector 1127 gathers the data values for each data item 1015*a*-1015*d* and provides collected data 1428 to each process running in rules engine feature extractor 1137.

Rules engine feature extractor 1137 includes one regex process for each one of output classes 1030. Only three are illustrated for clarity, although as many regex processes may be included as needed to correspond to each output class 1030. The illustrated processes are username regular expressions 1437*a*, passcode regular expressions 1437*b*, and credit card regular expressions 1437*c*. Each of these processes includes one or more regexes that are associated with the corresponding output class 1030. For example, username regular expressions 1437*a* may correspond to output class 1030*a*, passcode regular expressions 1437*b* may correspond to output class 1030*b*, and credit card regular expressions 1437*c* may correspond to output class 1030*c*. Username regular expressions 1437*a* includes one or more regexes indicative of username values. For example, a username may be limited to a string of alphabetic and numeric characters between three and twelve characters in length. Regexes for usernames would, therefore, correspond to any combination of alphabetic and numeric characters from 3-12 characters in length. If a data item being analyzed by username regular expressions 1437*a* included other symbols, such as "@" or "#," then that data item would not correspond to the regexes for usernames. Similarly, passcode regular expressions 1437*b* may include regexes that correspond to passcode rules. For example, a particular security zone may require passwords to include a minimum of 8 characters, including one or more upper- and lower-case alphabetic characters, one or more numeric digits, and one or more special characters. A regex for a credit card number may require a minimum of 16 characters, all numeric digits, grouped in a pattern of four digits with a space character between each group of four digits.

To generate a feature 1145*c* corresponding to output class 1030*a*, each value in collected data 1428 is compared to each regex in username regular expressions 1437*a*, and a corresponding match value is determined that indicates a degree to which that value matches that regex. After all values in collected data 1428 have been compared to all regexes, a feature corresponding to output class 1030*a* is generated based on the set of match values. In a like manner as described above for generating features, the generated feature may have a value from "0" to "1," with "0" indicating no match and "1" indicating a match. In some embodiments, the feature may have a binary value, either "0" or "1," while in other embodiments, each feature may include a range of fractional values between "0" and "1." To generate a respective feature 1145*c* corresponding to each of output classes 1030*b* and 1030*c*, passcode regular expressions 1437*b* and credit card regular expressions 1437*c* are performed in a similar manner with collected data 1428 being compared to respective sets of regexes. Features 1145*c* extracted from the comparison of the plurality of regular expression processes to set of data items 1015 are included with features 1145.

It is noted that FIG. 14, is one example for illustrating the disclosed concepts. Three regular expression processes are illustrated. In various embodiments, any suitable number of regular expression processes may be included.

FIGS. 10-14 provide examples of various systems and techniques for utilizing a neural network classifier in a database scanning process. The scanning systems, as described above, may be operable to perform a variety of methods. Several examples of such methods are depicted below in FIGS. 15-17.

Proceeding now to FIG. 15, a flow diagram illustrating an example method 1500 for performing a scan of a database is depicted, according to some embodiments. In various embodiments, method 1500 may be performed by computer system 1001 of FIG. 10 to identify data items in database 1010. For example, computer system 1001 may include (or have access to) a non-transitory, computer-readable medium having program instructions stored thereon that are executable by computer system 1001 to cause the operations described with reference to FIG. 15. Referring collectively to FIGS. 10 and 15, method 1500 begins in block 1501.

At block 1510, in the illustrated embodiment, method 1500 includes performing, by computer system 1001, a scan to identify data items in database 1010 that correspond to one or more of a plurality of specified output classes 1030. In some embodiments, the scan may correspond to one or more scans described above, such as in block 810 of method 800 in FIG. 8. In such embodiments, the scan may be used to identify data items stored in a particular security zone, and output classes 1030 are indicative of various types of sensitive data that should be stored in accordance with a particular set of security rules. In other embodiments, the scan may be independent of the security scans described in reference to FIGS. 1-9. In various embodiments, the scan may be initiated in response to a particular event, may be performed on a periodic schedule, or may be constantly repeated. The scan includes operations 1520-1550, as described below.

Method 1500, at block 1520, includes determining metadata 1020 for a portion of database 1010, wherein metadata 1020 includes schema information 1023. Metadata 1020 may include a variety of information regarding the portion of database 1010, including, for example, filenames for one or more data objects included in the portion. In some embodiments, the portion of the database corresponds to a single data object, such as data object 1102 of FIG. 11. Schema information 1023 includes information associated with a data structure of a data object. For example, schema information 1023 may include a name of the data object, names of tables included in the data object as well as names of columns and/or rows in these tables. In addition to determining metadata 1020, an analysis is performed to determine a degree of similarity between metadata 1020 and metadata associated with each of output classes 1030. The determining and analyzing processes, in some embodiments, correspond to metadata extraction pipeline 1200 of FIG. 12.

At block 1530, the method further includes generating data profile 1025 for set of data items 1015 stored in the portion of database 1010. Generating data profile 1025 includes performing a character-based analysis of set of data items 1015. Set of data items 1015, corresponds to group of data items within a given data object with similar characteristics and data types. For example, the given data object may be a table and set of data items 1015 may be one row or one column of this table. The character-based analysis performed on set of data items 1015 includes determining a character composition of the values for each data item of set of data items 1015. This analysis may further include determining a degree of similarity between data profile 1025 and common data profiles associated with each of output classes 1030. The data profile generating process, in some embodiments, corresponds to data profile transformation pipeline 1300 of FIG. 13.

At block 1540, method 1500 also includes identifying whether set of data items 1015 corresponds to one of the plurality of specified output classes 1030 by utilizing multi-class neural network classifier 1005, that is trained to perform the identifying using a plurality of features, including features extracted from the metadata and the data profile. The analyses performed in association with determining metadata 1020 and generating data profile 1025 produce a plurality of features that are sent to neural network classifier 1005. Each feature is a value, from "0" to "1," that indicates a degree of similarity between a particular characteristic of set of data items 1015 and a corresponding one of output classes 1030. In various embodiments, a value of each feature may be a binary value of "0" or "1," or a fractional value from "0" to "1." In some embodiments, a set of features may include a combination of binary features and fractional features.

The method further includes, at block 1550, identifying, based on outputs 1035 of neural network classifier 1005, a particular output class of the plurality of specified output classes 1030 that corresponds to set of data items 1015. Neural network classifier 1005 uses the received features to generate outputs 1035. Each one of outputs 1035 corresponds to a respective one of output classes 1030, such that there is a one-to-one correspondence between outputs 1035 and output classes 1030. In some embodiments, outputs 1035 may be binary values with a "0" indicating the corresponding output class 1030 has little to no correlation to set of data items 1015 and a "1" indicating a strong correlation between the corresponding output class 1030 and set of data items 1015. In such an embodiment, only one output 1035 for set of data items 1015 may have a value of "1" while the remaining outputs 1035 have values of "0." In other embodiments, outputs 1035 may have values represented by real numbers with a range of values. In such embodiments, an output 1035 with a highest value may indicate that the corresponding output class 1030 has the strongest correlation to set of data items 1015. Furthermore, a threshold value may be compared to the output 1035 with the highest value. If the highest value does not satisfy this threshold value, then neural network classifier 1005 may determine that set of data items 1015 does not correspond to any of output classes 1030.

Method 1500 is described as identifying a correlation between a set of data items and ones of the specified output classes. It is contemplated that variations of method 1500 may identify correlations between individual data items and ones of the specified output classes. Furthermore, it is noted that the values are described as higher values being indicative of a higher degree of correlation. It is also contemplated that, in some embodiments, the values of features and/or outputs may be reversed such that lower values provide an indication of increased correlation.

Moving to FIG. 16, a flow diagram illustrating an embodiment of a method for generating a set of features from metadata extracted from a set of data items in a data object is illustrated. Method 1600 may be performed, in some embodiments, by computer system 1001 of FIG. 10 to generate metadata features 1145a in FIG. 11. For example, computer system 1001 may include (or have access to) a non-transitory, computer-readable medium having program instructions stored thereon that are executable by computer system 1001 to cause the operations described with reference to FIG. 16. In some embodiments, the operations of method 1600 may correspond to operations included in blocks 1520 and/or 1540 in FIG. 15. Referring collectively to FIGS. 11 and 16, the method begins in block 1601.

Method 1600, at block 1610, includes extracting a name of a data object, a name of the set of data items, and data types of a set of data items in a data object. As illustrated in FIG. 12, metadata collector 1121, executing on computer system 1001, extracts table name 1202, column name 1215, and column data types 1215a-1215d from data object 1102. Table name 1202 is the name of data object 1102, column name 1215 is the name of set of data items 1015, and column data types 1215a-1215d corresponds to data types of data items 1015a-1015d. This extracted metadata corresponds to schema information 1023, and is sent to metadata feature extractor 1131 as part of a character-based analysis of data object 1102.

At block 1620, method 1600 includes comparing table name 1202 and column name 1215 to respective groups of names associated with each of output classes 1030. For each output class 1030, a predefined list of common table names and common column names are maintained by computer system 1001. Metadata feature extractor 1131 utilizes these predefined lists to determine a degree of similarity between schema information 1023 and each output class 1030. For each output class 1030, metadata feature extractor 1131 compares table name 1202 to the predefined list of table names for that output class, to determine a degree of similarity between table name 1202 and one or more of the table names in the predefined list. In a similar manner, metadata feature extractor 1131 compares column name 1215 to a predefined list of common column names for each output class 1030 to determine a degree of similarity between column name 1215 and one or more of the column names for a particular output class.

At block 1630, the method further includes comparing column data types 1215a-1215d to known column data types for each of data classes. As shown, computer system 1001 maintains a predefined list of common data types for each output class 1030. In a similar manner as used for the table name and column name, metadata feature extractor 1131 utilizes these predefined lists to determine a degree of similarity between column data types 1215a-1215d and each output class 1030.

Method 1600 also includes, at block 1640, generating a respective set of features for each of the plurality of specified data classes based on the comparisons performed in blocks 1620 and 1630. For each output class 1030, metadata feature extractor 1131 generates a corresponding one of features 1145a that is indicative of the degree of similarity between table name 1202 and one or more of the table names in the predefined list for that output class 1030. For data object 1102, one feature 1145a is generated for each output class 1030 based on table name 1202. In a similar manner, metadata feature extractor 1131 generates respective ones of features 1145a based on the comparisons of column name 1215 to each predefined list of column names. For set of data items 1015, one feature 1145a is generated for each output class 1030 for column name 1215. Based on column data types 1215a-1215d for set of data items 1015, one of features 1145a may be generated for each output class 1030. As described above, a value for each feature 1145a may range in value between "0" and "1," with "1" corresponding to a highest level of correlation. Other methods for rating and scaling the degree of correlation are contemplated. The method ends in block 1690.

Method 1600 of FIG. 16 is merely an example. Although the operations are presented as occurring in a serial manner, the illustrated operation may be performed in a different order and/or with some operations performed in parallel. For example, blocks 1620 and 1630 may be performed by respective processes running in parallel. Furthermore, it is noted that values of the features are described as higher values indicating higher degrees of correlation. It is contemplated that, in some embodiments, the values of features may be reversed such that lower values provide an indication of increased correlation.

Turning to FIG. 17, a flow diagram illustrating an embodiment of a method for generating a set of features from a data profile determined from a set of data items in a data object is shown. In some embodiments, method 1700 may be performed by computer system 1001 of FIG. 10 to generate data profile features 1145*b* in FIG. 12. In such embodiments, computer system 1001 may include (or have access to) a non-transitory, computer-readable medium having program instructions stored thereon that are executable by computer system 1001 to cause the operations described with reference to FIG. 17. The operations of method 1700 may, in some embodiments, correspond to operations included in blocks 1530 and/or 1540 in FIG. 15. Referencing FIGS. 12 and 17, the method begins in block 1701.

At block 1710, method 1700 includes determining a first number of alphabetic characters and a second number of numeric characters included in each data item of the set of data items. As illustrated, data items 1015*a*-1015*d* included in set of data items 1015 include alphanumeric characters. Data profile transformer 1123, a process running on computer system 1001 of FIG. 10, determines, for each data item 1015*a*-1015*d*, a corresponding distribution 1315*a*-1315*d* that includes two counts. A first count indicates a number of alphabetic characters included in the corresponding data item, while a second count indicates a number of numeric digits. For example, distribution 1315*b* includes counts of "A2" and D4." The first count of A2 indicates that corresponding data item 1015*b* includes the two alphabetic characters, "x" and "y." The second count of D4 indicates that data item 1015*b* includes four digits, "2," "0," "0," and "1." Although two types of characters are illustrated, alphabetic and numeric, other types may be utilized in other embodiments. For example, additional character types may include lowercase alphabetic, uppercase alphabetic, numeric digits, and special characters (e.g., punctuation, arithmetic operators).

Method 1700, at block 1720, includes determining, for set of data items 1015, a distribution of character compositions of data items 1015*a*-1015*d*. As shown in FIG. 12, data profile transformer 1123 uses the character counts from block 1710 to determine data profile 1324, which includes a summary of a character composition for all data items in set of data items 1015. In the example, data profile 1324 indicates that one data item includes zero alphabetic characters, one data item includes two alphabetic characters, and two data items include three alphabetic characters. Data profile 1324 also indicates that one data item includes zero digits, one data item include three digits, and two data items include four digits. Data profile transformer 1123 further determines a percentage or ratio for each count value in reference to a total number of data items in set of data items 1015. These ratios are sent to data profile feature extractor 1133, running on computer system 1001.

The method further includes, at block 1730, applying data profile 1324 to a similarity neural network classifier trained to identify similarities of data profile 1324 to each of output classes 1030. Data profile feature extractor 1133 includes neural network similarity classifier 1333*a*. Similarity classifier 1333*a*, as shown, receives data profile 1324 and compares the determined character composition to one or more respective data profiles common to each output class 1030. For example, similarity classifier may use ten data profiles that are common to output class 1030*b*, and compare these ten common data profiles to data profile 1324. A value is generated that is indicative of a degree of similarity between data profile 1324 and one or more of the ten common data profiles. For example, one common data profile for a credit card number is sixteen digits and no alphabetic characters. A data profile 1324 with a high ratio for a "D16" count may result in a value indicating a strong correlation for the credit card class.

At block 1740, the method includes applying data profile 1324 to a dissimilarity neural network classifier trained to identify dissimilarities of data profile 1324 to each of output classes 1030. Data profile feature extractor 1133 further includes neural network dissimilarity classifier 1333*b*. In a similar manner as similarity classifier 1333*a*, dissimilarity classifier 1333*b* receives data profile 1324 and compares the determined character composition to one or more respective data profiles that are associated with each output class 1030. Dissimilarity classifier 1333*b* determines a value for each output class 1030 that indicates a degree of dissimilarity between set of data items 1015 and characteristics of that output class. Whereas similarity classifier 1333*a* analyzes data profile 1324 for similarities to each output class 1030, dissimilarity classifier 1333*b* looks for dissimilar characteristics. Returning to the credit card example above, the data profile 1324 with a high ratio of D16 counts may result in a strong correlation to the credit card class. If, however, the same data profile 1324 indicates a high occurrence of alphabetic characters in the corresponding set of data item, then the dissimilarity value for this set of data items may indicate a strong dissimilarity between the set and the credit card class. In some embodiments, a higher determined value may indicate a strong dissimilarity, while other embodiments may utilize a lower value to indicate a strong dissimilarity.

Method 1700 also includes, at block 1750, including, with the plurality of features, features that are extracted from the applications of the distribution of character compositions to the similarity and dissimilarity neural network classifiers. For a given set of data items, each of similarity classifier 1333*a* and dissimilarity classifier 1333*b* generate one of features 1145*b* for each output class 1030. As previously described, each feature 1145*b* may be a value between "0" and "1." A value of "1" indicates a high level of similarity for the features generated by similarity classifier 1333*a*. In various embodiments, dissimilarity classifier 1333*b* may use either "0" or "1" to indicate a strong level dissimilarity to a given output class. The generated features 1145*b* are included as part of features 1145 that are sent to neural network classifier 1005 to generate outputs 1035, as shown in FIG. 11. The method ends in block 1790.

The method illustrated in FIG. 16 is an example for demonstrating disclosed concepts. Variations of the method may be utilized in other embodiments. For example, some operations, although presented in a serial order, may be performed in a different order and/or performed in parallel. For example, blocks 1730 and 1740 may be performed by respective processes running in parallel.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "devices," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "processes" operable to perform designated functions are shown in the figures and described in detail above (e.g., scanning process 230, conversion process 220, etc.). As used herein, the term "process" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A process may also be implemented in programmable hardware devices such as field programmable gate arrays, programmable array logic, programmable logic devices, or the like. A process may also be any suitable form of non-transitory computer-readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:

performing, by a computer system, a scan to identify sets of data items in a database, wherein a given set corresponds to one of a plurality of specified output classes, the scan including:

determining metadata for a particular set of data items in a portion of the database, wherein the metadata includes schema information;

generating, for the particular set of data items stored in the portion of the database, a data profile including a character-based analysis of ones of the particular set of data items, wherein the character-based analysis includes:

using a similarity neural network classifier trained to generate a first set of features based on similarities of the particular set of data items to ones of the plurality of specified output classes; and using a dissimilarity neural network classifier trained to generate a second set of features based on dissimilarities of the particular set of data items to ones of the plurality of specified output classes;

identifying whether the particular set of data items corresponds to one of the plurality of specified output classes by utilizing a multi-class neural network classifier trained to perform the identifying using a plurality of features, including features extracted from the metadata and the first and second sets of features; and identifying, based on outputs of the multi-class neural network classifier, a particular output class of the plurality of specified output classes that corresponds to the particular set of data items.

2. The method of claim 1, wherein the scan further includes:

applying each of a set of rules to the particular set of data items stored in the portion of the database, wherein each rule represents a regular expression corresponding to one of the plurality of specified output classes; and wherein the multi-class neural network classifier is trained to perform the identifying using a third set of features that includes features extracted from application of the set of rules.

3. The method of claim 1, wherein the portion of the database is a table that includes a plurality of columns, wherein the particular set of data items is one of the plurality of columns, and wherein the determined metadata includes a table name, a column name, and a column data type.

4. The method of claim 3, wherein each output class of the plurality of specified output classes has a predefined list of common column names and common table names for that output class, and wherein extracting the features from the metadata includes:

generating, for each output class, a feature for each of the common column names and the common table names, wherein the generating is performed by applying a character-based neural network classifier to the predefined list of the common column names and the common table names, respectively, for that output class.

5. The method of claim 4, wherein each output class has a predefined list of acceptable data types, and wherein extracting the features from the metadata includes generating a feature for each output class that indicates whether a column of the database includes an acceptable data type for that output class.

6. The method of claim 1, wherein generating the data profile includes determining an alphanumeric composition of characters by determining a first set of values, wherein a given value of the first set corresponds to a number of alphabetic characters included in a respective data item of the particular set of data items.

7. The method of claim 6, wherein determining the alphanumeric composition of characters includes determining a second set of values, wherein a given value of the second set corresponds to a number of numeric characters included in a respective data item of the particular set of data items.

8. The method of claim 7, wherein the second set of features includes features extracted from application of a distribution of character compositions to the similarity and dissimilarity neural network classifiers.

9. A non-transitory computer-readable medium having instructions stored thereon that are executable by a computer system to perform operations, comprising:

scanning to match a particular set of data items of a plurality of sets in a database to a respective one of a plurality of specified output classes, wherein the scanning includes:

extracting metadata from the particular set of data items, wherein the metadata includes schema information;

generating, for the particular set of data items, a data profile including a character-based analysis of ones of the particular set of data items, wherein the character-based analysis includes:

using a similarity neural network classifier trained to generate a first set of features based on similarities of ones of the plurality of specified output classes to corresponding data items of the particular set of data items; and using a dissimilarity neural network classifier trained to generate a second set of features based on dissimilarities of the ones of the plurality of specified output classes to corresponding data items of the particular set of data items;

identifying, using a multi-class neural network classifier, similarities of the set of data items to ones of the plurality of specified output classes, wherein the multi-class neural network classifier is trained to perform the identifying using a plurality of features, including features extracted from the metadata and the first and second sets of features; and selecting, based on the similarities identified by the multi-class neural network classifier, one or more of the plurality of specified output classes that are most similar to the set of data items.

10. The non-transitory computer-readable medium of claim 9, wherein the scanning further includes:

comparing a plurality of regular expressions to the particular set of data items stored in the database, wherein each regular expression of the plurality corresponds to one of the plurality of specified output classes; and wherein the multi-class neural network classifier is trained to perform the identifying using a third set of features that includes features extracted from the comparison of the plurality of regular expressions to the particular set of data items.

11. The non-transitory computer-readable medium of claim 9, wherein the schema information includes a table name, a column name, and a column data type associated with the database.

12. The non-transitory computer-readable medium of claim 11, wherein each output class of the plurality of specified output classes has a predefined list of common column names and common table names for that output class, and wherein extracting the metadata from the particular set of data items includes generating, for a particular output class, a respective feature based on a comparison of the schema information to the predefined list for the particular output class.

13. The non-transitory computer-readable medium of claim 9, wherein generating the data profile includes determining an alphanumeric composition of characters by determining a number of alphabetic characters and a number of numeric characters included in each data item of the particular set of data items.

14. The non-transitory computer-readable medium of claim 13, wherein generating the data profile includes:
summarizing a distribution of character compositions using the number of alphabetic characters and the number of numeric characters included in each data item; and
determining a number of the data items within the particular set of data items that have similar numbers of alphabetic and numeric characters.

15. A method, comprising:
performing, by a computer system, a scan to identify data items in a database that correspond to ones of a plurality of specified output classes, the scan including:
determining metadata for a particular set of data items in a portion of the database, wherein the metadata includes schema information;
generating, for the particular set of data items stored in the portion of the database, a data profile including a character-based analysis of ones of the particular set of data items, wherein the character-based analysis includes:
using a similarity neural network classifier trained to generate a first set of features based on similarities of the ones of the plurality of specified output classes to corresponding data items of the particular set of data items; and
using a dissimilarity neural network classifier trained to generate a second set of features based on dissimilarities of the ones of the plurality of specified output classes to corresponding data items of the particular set of data items; and
predicting that the particular set of data items corresponds to one or more of the plurality of specified output classes, wherein the predicting includes sending, to a neural network classifier, features that are based on the metadata and the first and second sets of features.

16. The method of claim 15, wherein the scan further includes:
comparing a plurality of regular expressions to the particular set of data items, wherein each regular expression of the plurality corresponds to one of the plurality of specified output classes; and
wherein the predicting further includes sending, to the neural network classifier, features that are based on the comparing.

17. The method of claim 15, wherein the schema information includes a table name, a column name, and a column data type associated with the portion of the database.

18. The method of claim 17, wherein each output class of the plurality of specified output classes has a predefined list of common column names and common table names for that output class, and wherein extracting the metadata from the particular set of data items includes generating, for a particular output class, a respective feature based on a comparison of the schema information to the predefined list for the particular output class.

19. The method of claim 18, wherein the comparison of the schema information to the predefined list of common column names and common table names includes, for each output class:
identifying a particular one common table name and a particular one common column name based on the comparison; and
generating the respective feature using a prediction that the schema information matches the particular one common table name and the particular one common column name.

20. The method of claim 15, wherein generating the data profile includes determining an alphanumeric composition of characters by determining a number of alphabetic characters and a number of numeric characters included in each data item of the particular set of data items.

* * * * *